United States Patent
Levine

(10) Patent No.: US 7,363,233 B1
(45) Date of Patent: Apr. 22, 2008

(54) SYSTEM AND METHOD OF NETWORK ADDRESSING AND TRANSLATION IN A TRANSPORTATION SYSTEM

(76) Inventor: Richard C. Levine, 7950 Woodstone, Dallas, TX (US) 75248

( * ) Notice: Subject to any disclaimer, the term of this patent is extended or adjusted under 35 U.S.C. 154(b) by 0 days.

(21) Appl. No.: 09/550,960

(22) Filed: Apr. 17, 2000

(51) Int. Cl.
G06Q 99/00 (2006.01)
G06F 15/177 (2006.01)

(52) U.S. Cl. .......................... 705/1; 709/220; 709/222

(58) Field of Classification Search ............... 705/401, 705/403, 404, 406, 408, 410, 60, 62, 1, 5–9, 705/11, 22, 23, 28, 29; 380/51, 55; 709/220, 709/222
See application file for complete search history.

(56) References Cited

U.S. PATENT DOCUMENTS

| | | | |
|---|---|---|---|
| 4,024,380 A * | 5/1977 | Gunn | 705/408 |
| 4,743,747 A * | 5/1988 | Fougere et al. | 380/51 |
| 5,341,505 A * | 8/1994 | Whitehouse | 705/408 |
| 5,465,295 A * | 11/1995 | Furman | 379/221.14 |
| 5,819,241 A * | 10/1998 | Reiter | 705/408 |
| 5,930,796 A * | 7/1999 | Pierce et al. | 705/410 |
| 5,943,658 A * | 8/1999 | Gravell et al. | 705/410 |
| 6,076,121 A * | 6/2000 | Levine | 709/222 |
| 6,178,411 B1 * | 1/2001 | Reiter | 705/408 |
| 6,240,403 B1 * | 5/2001 | Shah et al. | 705/408 |
| 6,285,777 B2 * | 9/2001 | Kanevsky et al. | 382/101 |
| 6,389,455 B1 * | 5/2002 | Fuisz | 709/206 |
| 6,427,164 B1 * | 7/2002 | Reilly | 709/206 |
| 6,466,921 B1 * | 10/2002 | Cordery et al. | 705/60 |
| 6,549,892 B1 * | 4/2003 | Sansone | 705/401 |
| 2002/0032623 A1 * | 3/2002 | Wheeler et al. | 705/28 |

FOREIGN PATENT DOCUMENTS

| | | |
|---|---|---|
| EP | 0 400 771 | 12/1990 |
| EP | 0 701 358 | 3/1996 |
| GB | 2 307 137 | 5/1997 |

(Continued)

OTHER PUBLICATIONS

"The electronic mailcenter", Office Systems, Aug. 1998, v15n8 PP:22-28.*

(Continued)

Primary Examiner—Igor N. Borissov
(74) Attorney, Agent, or Firm—Baker Botts L.L.P.

(57) ABSTRACT

A method for routing an object in a transportation network is provided. The method includes obtaining at a first point a first address and a first functional property code associated with an object to be routed. The method also includes storing at a data base a second functional property code, a second address, and a third address associated with a second point. The method further includes sending the first address and the first functional property code from the first point to the data base and determining at the data base if the first address is compatible with the second address. The method additional includes determining at the data base if the first functional property code is compatible with the second functional property code if the first address is compatible with the associated second address and sending the third address to the first point if the first functional property code is compatible with the second functional property code.

168 Claims, 4 Drawing Sheets

FOREIGN PATENT DOCUMENTS

GB        2193160 A    *  2/1998
WO        WO 99/46917  *  9/1999

OTHER PUBLICATIONS

Alireza Khotanzad and James J.-H. Liou, "Recognition and Pose Estimation of Unoccluded Three-Dimensional Objects from a Two-Dimensional Perspective View by Banks of Neural Networks," *IEEE Transactions on Neural Networks*, vol. 7, No. 4, pp. 897-906, Jul. 1996.

Kerry W. Hassler et al., "Revolutionizing DEFINITY® Call Centers in the 1990s," *AT&T Technical Journal*, Jul./Aug. 1995, 10 pages.

Supplementary European Search Report in European Patent Application No. EP 99 91 2546, dated Dec. 2, 2004, 3 pages.

* cited by examiner

SYSTEM AND METHOD OF NETWORK ADDRESSING AND TRANSLATION IN A TRANSPORTATION SYSTEM

TECHNICAL FIELD OF THE INVENTION

This invention relates generally to networks and, more specifically, to a system and method of network addressing and translation in a transportation system.

BACKGROUND OF THE INVENTION

A network is a collection of points and links between these points. Networks typically transfer items of material substance or information via a link from an origin point (OP) to a transit point (TP), where the item being transferred is routed to another link for transfer to a destination point (DP).

Many networks in the prior art use a symbolic address (SA) to designate the destination point and/or certain intermediate points. For example, transportation networks for mail have traditionally used a symbolic address (SA) that is specified by the originator of a shipment and that is purely geographical in significance.

In a typical mail network operation, a user first addresses an item with an explicit SA, indicating where the item is to be sent (a destination SA), and the user's own explicit SA, indicating where the item was sent from (an origin SA), and then places the item in a mailbox or parcel drop box (a physical OP), effectively consigning the item to the transportation network. The postal service will then carry the item to a post office. There, the destination SA is read, and provided the destination SA is legible and meets certain criteria of the network, the office sorts the item according to the link or series of links that optimize the delivery of the item. The item is then transferred across the selected links and delivered to the DP associated with the destination SA.

This example of the prior art ultimately designates a geographical location via symbols that are known to, and in fact generated by, the human originator or some agent for the human originator. This is often awkward or slow to use in the prior art because the originator does not always know the necessary destination SA, or even geographical DP, before sending a shipment, and must expend significant time and effort to determine one or both of them. Moreover, even though the originator may know the street address of an office of a business, the same originator may not always know the distinct street address of the repair department or other departments that are appropriate for a particular shipment. In some cases, the originator lacks timely destination address information, and the particular group or division has relocated to a different geographical location and, hence, destination SA that is not known to the originator at the time of shipment. In other cases, the originator may only know only a partial or ambiguous address, such as "XYZ Corporation". Moreover, certain SAs are not accessible to all networks, such as the post office box number that is not accessible to a non-postal parcel delivery service. In the prior art of transportation, there is no network solution to this problem and such items are usually undeliverable.

SUMMARY OF THE INVENTION

The present invention substantially reduces or eliminates at least some of the problems and disadvantages associated with prior art systems and methods for routing items in a transportation network. Accordingly, in certain embodiments, the present invention provides a system and method of network addressing and translation in a transportation system.

In particular embodiments, the present invention utilizes a network for transporting an item between points within the system. To achieve this purpose, the network includes at least one origin point, at least one destination point, at least one node, a link for connecting the origin point to the node, a link for connecting the destination point to the node, and a routing system for directing an item from the origin point to the destination point. The routing system includes a destination symbolic address and at least one functional property (FP) code.

The invention can provide additional features. For example, the invention could include routing tables for directing the item being transferred to a predetermined destination point based on the destination symbolic address and the FP code(s). The invention has particular application to particular networks, such as a mail system, where at least one node includes a post office, or in a fluid pipeline network. To insure the integrity of transferred items, the routing system can provide an error detector for detecting an invalid address or an invalid item characteristic, which can include tables in memory.

Additional steps can be used. For example, the method of routing can comprise the step of assigning a pseudo-address to the item at a predesignated point for facilitating the transport of the item within the network. Also, the routing step could be accomplished through the use of routing tables.

The FP code(s) can be supplied by many techniques. For example, the FP code(s) can be entered by a user or by the network administration. Alternatively, the FP code(s) can be assigned by an automated item recognition device.

In particular embodiments, one object of the present invention is to provide up to date destination symbolic addresses to either the originator or the network. Symbolic addresses can change due to changes in postal addresses, relocation of businesses or people, or any other event that changes the location of a destination point.

For example, a large number of different destination firms may use different rooms or floors in a single building having a common single street address known to the public. They may all be rental tenants in that building, for example. However, the room or floor numbers are not generally known to the public, and in some cases, the various tenants may frequently relocate within the building to different rooms or floors when their space needs change. According to this object of the present invention, the sender need only know the street address, or in some cases even less, regarding the destination tenant. The appropriate complete and current destination information, including the precise room or floor number, will be provided automatically via the operation of the present invention, and a delivery person need not devote time to seeking the current room or floor number of each tenant in order to effect delivery.

In certain embodiments, an object of the present invention is to minimize the length and complexity of the destination symbolic address entered by the originator. This is a matter of convenience and ease, but also is significant when the addressing scheme used by the originator is limited in the number of symbols or the specificity of the address that can be entered.

In other cases, the geographical destination is too complex for most human senders to deal with. For example, in a warehouse or part assembly situation, an automatic or semi-automatic vehicle or part insertion machine locates the source or destination by two or three numeric space coordinates, which give the distance from an appropriate reference point in space. Thus, in one case, the source location or the destination of a piece part may be given by the conventional x, y and z three-dimensional orthogonal rectangular space co-ordinates. In another case, the source or destination location is specified by cylindrical co-ordinates conventionally represented by the letter symbols r, θ, and z. The cylindrical co-ordinates would be appropriate for an item handling machine or part inserting machine that uses a radial arm that can extend and retract in the radial direction, r, rotate about a vertical axis to a specified angle, θ, and also move in a direction parallel to the rotation axis, z. When spatial co-ordinates are used, the units used to measure distance along the various rectangular axes may not be all the same, or the unit size may vary from one part of the co-ordinate axis to another. As one example, the vertical axis may be measured in floors or stories in a building (and not all stories necessarily have equal physical height), while the two horizontal axes may be measured in feet (or meters). In another example, one horizontal axis may be measured in a variable length unit that represents the distance between aisles or shelves, while the other horizontal axis may be measured in another variable length unit representing a shelf module length. These units are variable in certain installations because different sizes of shelf modules and aisle spacing are used in different parts of the same building or side by side along the same geometrical axis, and/or the physical ceiling height and shelf height on different floors in the same building are different as well. The complexity of using differing geographical co-ordinate systems and/or variable length units of distance measurement renders the control of an automatic or semi-automatic part picking or part inserting machine too complex for most human users to input the appropriate geographic or absolute position address accurately and consistently. Additionally, the geographical destination can be even more complicated in cases where specifying the orientation of an object is necessary.

In certain embodiments, an object of the present invention is improved convenience and faster handling and accurate delivery of shipments in a transportation network. The present invention allows the originator to make use of information that is readily known to the originator, and then performs a translation from the originator furnished information to a geographic or other destination symbolic address that allows accurate and timely delivery or placement.

In particular embodiments, to achieve the objectives of convenience and accuracy, another related objective is that the information provided by the originator need not all be entered at the time of shipment nor at the location of origin of shipment. For example, a portion of the information may be pre-stored and then automatically retrieved from information memory at the time of shipment, or later during the transportation process.

An example of the former can occur in a company that makes a variety of consumer goods that require repair. To accomplish this, the company can establish open a repair depot that is open to the public, and which is typically at a location convenient to the public, where many people can drop off their goods that are in need of repair. This depot does not perform all repairs on the premises, but instead sends each item to an appropriate repair department location for the particular type of goods. A hair dryer or toaster would be sent to one repair location, while a radio or personal computer would be sent to another. The repaired goods may either be returned to the depot location for eventual retrieval by the consumer, or alternatively may be directly shipped back to the consumer's home. Because all shipments going out of this center are for repair, this "repair" functional property code may be stored in advance as a "default" used in the present invention for each outgoing shipment. Furthermore, the specific item contents of the message, such as a "hair dryer" or "radio" may be entered at shipping time as an optional functional property code, when this is appropriate descriptive information.

The pre-stored information may be selected or modified in a manner responsive to the choice of the human originator, responsive to properties of the destination, and/or responsive to properties of the substance or item being shipped. This additional information may be entered by a human being, or may be determined by automatic or semi-automatic apparatus. This information may be quantitative as well as qualitative. For example, shipments over a certain weight may be ultimately symbolically addressed to one geographic destination or carriage firm or method while those under that weight are addressed to another, even though the initial partial address that the originator enters regarding their destination is the same in both cases.

In several embodiments, the objectives of accurate delivery to the logically appropriate location and the objective of simple entry of a partial address are achieved by the use of a pseudo-address, which is internally meaningful in the transportation network, but which may not be meaningful in terms of traditional or conventional network addresses in the type of network used. As one example, a very precise numerical latitude, longitude (typically stated in degrees, minutes and seconds) and altitude (typically stated in meters) may be used as a pseudo-address even though this is not in a form acceptable for entry as a shipping address in most transportation networks. The shipping address acceptable to most traditional shipping networks is a conventional street address. As another example, distinct doors or entrances to the same building, or to outbuildings on the same property, may be assigned different pseudo-addresses having the same form as the conventional address, or a different form from the conventional address used for the main or front door of that building. Consider a building with multiple doors or entrances and exits, having the conventional address "12345 Main Street." Within this invention, the front door may indeed be designated by this conventional address. However, other doors to the same building or to other buildings on the same property may be designated by such pseudo-addresses as "1234h Main St.," "1234w Main St," "1234Main St.," etc. . . . One of these designations may refer to a distinct entrance or door that receives hazardous material only. Another may refer to a distinct entrance or door that is used as an exit for parcel pickup and outgoing shipments.

Other technical features and advantages will be readily apparent to those skilled in the art from the following figures, descriptions, and claims.

BRIEF DESCRIPTION OF DRAWINGS

The following drawings provide a more complete understanding of the present invention, especially when viewed in conjunction with the following detailed description, and also illustrate further features and advantages of the present invention.

DETAILED DESCRIPTION

Figure 1:
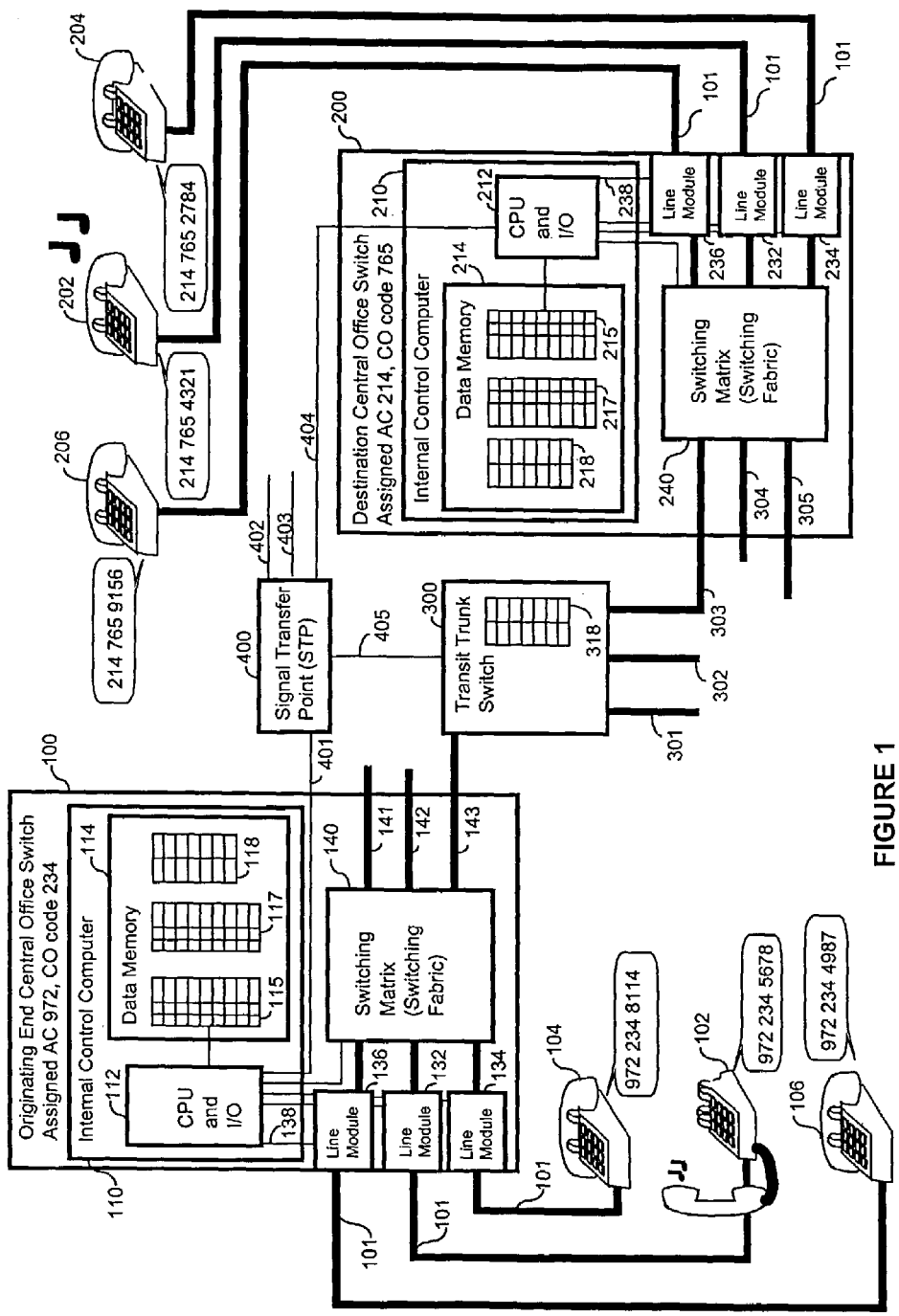
FIG. 1 illustrates an embodiment of a telecommunication network for practicing the invention.

A network is a collection of points (called origin points, transit points, destination points etc. and links between these points. The network transfers an item of material substance or information, which are collectively referred to as traffic, from an origin point (OP) through a link to a transit point, where the item being transferred is routed to another link for transport to a destination point (DP).

An OP is where an item enters a network. A DP is the final place where an item is to be delivered within the network. In most networks, each origin point can also function as destination point, and likewise, each destination point can also function as an origin point. Usually, a point's status depends only on the use of the point. Commonly identifiable points include telephones, cellular phones, data terminals, physical street addresses, shipping docks, and postal drop boxes.

Links are paths of travel. Commonly identifiable links include wires, radio waves, guided and/or unguided electromagnetic waves, laser beams, roads, airplane routes, shipping lanes, pipelines, corridors, vehicle delivery routes, or other transfer paths. Links may include antennas or other devices to facilitate the reception or communication of traffic.

Transit points, sometimes are called nodes, are located at link intersections. A transit point accepts an incoming item (for example, data or voice signals in a telephone network), and based on routing information that is logically associated with the item, the transit point routes the item to a link that will then carry the item to another transit point or to a predetermined destination point. Transit points may include telephone switching equipment, an Internet server, airports, rail track switches, depots, and the like.

The routing information that is logically associated with an item at a node commonly includes a symbolic address (SA), otherwise known as a symbolic network address. The SA may be logically associated with a physical item, a separate channel, or a logically different network, such as exchanging telephone numbers in Internet databases. An SA may designate the origin point of an item and/or the destination point of an item. Examples of distinct explicit SAs include "telephone" directory numbers (DNs) and residential or business street addresses.

At a transit point, switching algorithms are utilized to direct the flow of traffic from an origin point to a destination point using an item's SA. The most common algorithm uses tables, called translation tables (also called lists, arrays, or data bases), which comprise predetermined lists of matched inputs (typically destination point SAs) with corresponding possible outputs such as specific links. Various tables may be selected based on factors such as date, time of day, weather, or any of a variety of other conditions. Ideally, the transit point will use the destination SA to select an optimal path of travel for an arriving traffic. The methods of determining the path for traffic travel are dependent upon the use of a distinct explicit SA for each physical point in the network.

Multiple devices may be used to complete the communication of an item. For example, the telephone line designated by a particular telephone number may terminate to a telephone, cellular phone, fax machine, or computer. In the prior art, there has been no practical network method to indicate or control the functional properties or protocol of a terminal point, and to thereby preferably route traffic between compatible origin and destination points. For example, a user of a voice telephone cannot usefully communicate with a telefax machine, but there is no way for the user to know what type of device is associated with a particular DN.

By processing origin and/or destination functional property (FP) codes related to each selected point in a network and/or using the FP codes, in conjunction with at least a partial explicit network address, the routing in a network may be controlled, in particular embodiments. In these embodiments, one symbolic network address is assigned to one or more of destination points assigned to a subscriber, or group of subscribers. The complete address comprises the explicit symbolic destination address and the functional property code(s), and may include additional address indicators. Each destination point or preselected set of destination points is assigned at least one FP code to help distinguish it from other points in the network. When a plurality of points have the same explicit symbolic network address and FP code(s), a distinct transaction indicator code is assigned to uniquely distinguish each such point.

Typically, the FP code for a network point is determined in part by the specific equipment located at the network point. This enables routing systems to be developed such that a point with one FP code may automatically send and receive items to points with compatible FP code(s) when non-compatible devices share the same explicit symbolic network address. Alternatively, the FP code may be entered by a user when necessary to change the current functional property code of that network point (such as when a telephone handset is temporarily replaced by a fax machine) or redirect a network path.

Embodiments for a Telecommunication Network

A PSTN is composed of telephones, fax machines and other devices that can be used as origin points (OPs) or destination points (DPs). In a PSTN, each origin point and destination point has a telephone number, a type of SA. In a PSTN, each SA (telephone number) corresponds to a single link dedicated to that SA called a "subscriber line" (SL). PSTNs use wire lines and electromagnetic waves as links, and possess switching equipment at central offices (COs) or various transit switching offices. In a PSTN, the switching equipment serves as one type of transit point.

The PSTN industry commonly uses Signaling System Number 7 (S7) of Common Channel Signaling (CCS) as the standard control message protocol. To simplify the present discussion, and because S7 is well known and widely used in the PSTN art, S7 specifics are discussed only where necessary.

Each subscriber line or channel in a switch is assigned an internal line appearance number (ILAN) by the appropriate telephone switching administration. The ILAN is used in the internal call processing of a switch to identify a line for purposes of wiring repairs, to identify which line is originating a call, to route a connection within the switch to a particular destination, and the like. In effect, the internal ILAN numbering system of a switch can uniquely relate the internal number assigned for each subscriber line in use to the physical rack, shelf, and printed wiring card where the line appears.

Telephone directory numbers (DNs) are not the same as ILANs in a modern electronic telephone switch. DNs and ILANs are related to each other by translation tables. Then, as subscriber lines are disconnected and new subscriber lines are added to a PSTN, the telephone switching administrator needs only to assign the new subscriber line to an existing ILAN through software programming that modifies the data in the translation tables, rather than requiring a hardware or wiring change.

Table 1 is a simplified partial CO table that shows ILANs, the status of those ILANs, and the last four digits of the DN assigned to an individual ILAN. A table such as Table 1 is typically used for billing purposes and to allow the use of calling line identification (CLID) functions.

TABLE 1

| Line Appearance Number | In/Out of Service | Last 4 Digits of DN |
|---|---|---|
| 19316 | 1 | 8114 |
| 19317 | 1 | 5678 |
| 19318 | 1 | 4987 |
| 19319 | 0 | — |

When the person originating a telephone call lifts a telephone handset "A" and dials digits, the central office switching equipment receives an internal signal that is identified with the ILAN of the OP, telephone handset A. When an incoming call comes from a different OP toward telephone handset A, now a DP, the destination SA is identified as the DN of telephone handset A. When the DN is thus given, the translation table used is organized to translate DN into ILAN, so the proper destination line can be connected for such an incoming call. When the ILAN is given, as in the case of the origination from line A, a distinct translation table organized to translate ILAN into DN is used, so the proper DN can be used for calling line ID services and so the call will be billed to the proper origination line.

Links between telephone switches are called trunks. In most installations, a telephone switch has a plurality of trunks, each trunk or group of trunks leading to a different transit or destination switch in the PSTN. Other translation tables use proprietary internal numbering identifications to select the optimum outgoing trunks to reach a specific ultimate DP, based on translation tables that relate the destination SA (or a portion thereof) to the optimum trunk. Various transit switches in the PSTN likewise use appropriate translation tables to select the optimum outgoing trunk to convey the item to its ultimate destination. The result of using such translation tables is responsive to the DN of the DP, or to some pre-designated portion of the DN, such as the area code or the CO code.

When a called telephone has answered an incoming call, a two-way connection is established through the PSTN trunks and transit switches. In older telephone technology, such a connection was established by electrically connecting appropriate wires for each conversation, and the information content of the conversation was conveyed in the form of analog voltage waveforms that were representative of the analog audio frequency waveform occurring at the OP and DP equipment. In modern telephone technology, digitally coded representations of audio wave forms are used and the connection is established by communicating digital traffic in blocks of various quantities of bits (such as 8 bits, 384 bits, 424 bits, or other) through the links, which permit the communication of multiple channels via the same link.

FIG. 1 illustrates an embodiment of a PSTN in which the present invention may be implemented. The PSTN is comprised of: a first central office switch 100, a second central office switch 200, a first telephone handset 102 assigned to SL 19722345678, a second telephone handset 104 assigned SL 19722348114, a third telephone handset 106 assigned SL 19722344987, a fourth telephone handset 202 assigned SL 12147654321, a fifth telephone handset 204 assigned SL 12147652784, a sixth telephone handset 206 assigned SL 12147659156, a transit trunk switch 300 and a signal transfer point (STP) 400. Various telephone lines 101 connect telephone handsets 102, 104, 106, 202, 204, 206 with CO switches 100 and 200.

First CO switch 100 is assigned area code 972 and central office code 234, and contains within it an internal control computer 110, a first line module 132, a second line module 134, a third line module 136 and a switching matrix 140. Internal control computer 110 contains a central processing unit (CPU) 112 and data memory 114. Data memory 114 stores tables 115, 117 and 118.

Second CO switch 200 is assigned area code 214 and central office code 765, and contains within it an internal control computer 210, a fourth line module 232, a fifth line module 234, a sixth line module 236 and a switching matrix 240. Internal control computer 210 contains a central processing unit (CPU) 212 and data memory 214. Data memory 214 stores tables 215, 217 and 218.

In operation, when a user lifts first telephone handset 102, first line module 132 detects that its assigned point has been activated. The user then hears a dial tone, and dials the directory number (DN) of another telephone, such as fourth telephone handset 202. Line module 132 communicates the ILAN of telephone handset 102 to internal control computer 110 through internal data lines 138.

On a computing level, CPU 112 uses Table 215, a portion of which is shown in Table 1, to translate the ILAN of line module 132 into the DN of its assigned SL. Here, Table 1 is used to find that first line module 132, associated with ILAN 19317, is in service (represented in Table 1 by a "1", whereas a "0" would indicate that a line is out of service) and that first line module 132 is assigned to DN 5678. Although a four digit partial DN is shown, it should be understood that larger partial DNs can be used and their use is well known in the art.

Internal control computer 110 then proceeds to separate the dialed digits into code sections. For example, the dialed digits 1-214-765-4321 have a country code section "1.," an area code section "214," and a central office (CO) code section "765." Thus, internal control computer 110 detects that the dialed DN is a United States non-local call by detecting the leading "1", that the call is destined for area code "214", and that the call is destined for the central office number "765" within area code "214."

Table 2, representing a portion of table 118, shows which trunk group is assigned to an area code. In our example, area code 214 leads to a trunk group 143, which is identified with proprietary internal outlet trunk group number 3 in Table 2. Proprietary group 3 is identified with outgoing trunk 143.

TABLE 2

| Area Code | Outlet Trunk Group Number |
|---|---|
| 213 | 1 |
| 214 | 3 |
| 215 | 2 |
| 216 | 2 |

For illustrative purposes, should the call have been directed to a DN within first CO 100, outgoing trunks would not be selected, but a table such as Table 3 would be used to complete the transaction to the proper ILAN and DP. Table 3 represents data resident in data table 217 in second CO switch 200, but a similar table is resident in first CO 100 and other switches. Table 3 translates the CO's DNs into ILANs.

TABLE 3

| Last 4 Digits of DN | In/Out of Service | Line Appearance Number |
|---|---|---|
| 4319 | 0 | — |
| 4320 | 1 | 31597 |
| 4321 | 1 | 26433 |
| 4322 | 1 | 1325 |

After internal control computer 110 selects the appropriate trunk group 143, internal control computer 110 selects an idle line or channel within trunk group 143, which is then connected to originating telephone handset 102 through switching matrix 140.

Internal control computer 110 then sends an initial address message (IAM) signal on a signaling channel 401 to inform signal transfer point (STP) 400 of the line being used within trunk group 143 to send the communication. STP 400 uses this information to inform transit trunk switch 300 and second CO switch 200 of the impending communication. Transit trunk switch 300 may possess computers, tables, and a switching matrix similar to those shown in CO switches 100 and 200. Transit trunk switch 300 routes the communication, in a manner similar to that already described, from first CO switch 100 to second CO switch 200 on the outgoing link 303.

Table 4 illustrates that trunk groups are also assigned to central or transit switching offices in a similar manner. For example, within an area code 214, end office code 767 leads to Outlet Trunk Group Number 1, trunk 301, from transit switch 300.

TABLE 4

| End Office Code | Outlet Trunk Group Number |
|---|---|
| 764 | 2 |
| 765 | 3 |
| 766 | 3 |
| 767 | 1 |

Next, internal control computer 210 examines the dialed digits data within the IAM. The last four digits of the DN are then used as the input to Table 3. From Table 3, it is seen that DN 4321 is in service and corresponds to line appearance number 26,433, which runs to line module 232. Internal control computer 210 then tests to see if the line is idle or busy, via techniques well known in the art, and rings the line if not busy.

Internal control computer 210 then sends an S7 formatted message back to internal control computer 110 through the signaling link 404 via STP 400 to confirm the ringing status of the incoming communication. Internal control computer 110 then signals a tone generator (not shown) to send a ringing tone to the originating DN. Once telephone handset 202 is lifted, internal control computer 210 connects the communication from transit trunk switch 300 through switching matrix 240 to line module 232 and signals this status change back to first CO switch 100.

As soon as either party hangs up telephone handsets 102 or 202, the CO switch associated with that telephone handset detects the event electronically and sends a release signal to the other CO switch and releases the relevant network links. The other CO switch typically responds to the release signal to confirm release of the communication.

As discussed up to this point, a telephone line user of the PSTN in FIG. 1 is normally forced to obtain a separate distinct SA for each line and/or device, such as a voice telephone and fax machine, connected to the PSTN. This is an example of the causes that have resulted in number exhaustion and the need for many new area codes, which is inconvenient and costs telephone subscribers and administrators money, and which causes delayed or often misdirected communication. Furthermore, with enough available DNs in a network, systems already exist that allow for error detection of incorrectly entered DNs. The exhaustion of available DNs reduces or eliminates the ability to assign DNs in such a way as to allow such error detection. Numerous other improvements in telephone dialing plans are desirable, but are not possible to implement in the prior art, due to the pressure of number exhaustion.

For example, parity check codes or alternating digit check sum codes are just two of many error protection codes well known in the art, and are used in internal portions of existing telecommunications networks, where data is exchanged from one machine to another. Error protection codes for human entry of such numbers as credit card and bank account numbers have already been used in data processing systems. But error protection codes have not been used heretofore for the human entry of a DN or other symbolic address in a telecommunications network. The exhaustion of available DNs reduces or removes the ability to allow DN entry error protection or to use protected central office codes (a method well known in the art to allow use of local telephone 7 digit dialing in boundary areas of different area codes).

The use of multiple DNs by different telephone lines of a user can create other problems. For example, the user must often list four or five telephone numbers on business cards, directories and stationery for voice, fax, cell phone, children's residential line(s), etc. Multiple DNs also confuse persons trying to reach the user, resulting in faxes going to voice lines and voice calls terminating at data receivers.

So-called "500" or "personal agent" number services do exist in the prior art. In these services, callers dial one special DN, such as 1 500 876 5432, to reach a particular person. As a result of calling this one DN, pre-programmed switching equipment will in turn dial to one or more pre-designated explicit DNs, either sequentially (in what is called a hunt sequence) or simultaneously, and then connect the originator to the first one which answers. This personal agent service in the prior art is ultimately unsatisfactory for many users because: first, it requires the use of one additional explicit DN rather than reducing the quantity of explicit DNs; second, it does not distinguish various distinct lines, such as a voice line compared to a fax line; third, due to these two aspects of its operation, it exacerbates rather than alleviates the basic problem of number exhaustion.

Some networks, or portions of certain networks, are distinguished from others that are technologically similar and nominally compatible because they are operated by unaffiliated or competitive businesses. In some cases, these distinguishable networks do not serve all destinations for legal or business competitive reasons, even though an otherwise valid SA is used by the originator. In telecommunications networks, the advent of local number portability (LNP), now mandated by the government telecommunications regulatory agencies of several nations to encourage local exchange carrier competition, requires the telephone network as a whole to establish a network path to the proper destination for a user even when that user's telephone line is now on a "new" or "recipient" competitive local exchange operator/administrator's CO switch and is no longer served by the "donor" CO having the nominal area code and CO code of that user's pre-existing explicit DN. Various methods for effectively either forwarding such calls or re-originating such calls after performing a global title translation (telephone jargon for substitution of a distinct destination explicit DN derived from an appropriate translation data list) on the dialed digits have been espoused by various interests in the telephone industry. Many of these proposed methods have the undesirable result of requiring additional explicit DNs for each such ported subscriber exchange switch, and thus do not contribute to solving the number exhaustion problem, although they can port unassigned numbers to recipient switches where there is a local shortage of DNs.

In particular embodiments of the invention in a telecommunication network, two distinct types of symbolic address are used, each one in conjunction with appropriate parts of the network. One type comprises an explicit destination address of the conventional DN type together with appropriate FP code(s), and a possible transaction indicator code (described below). In one embodiment, the FP code(s) and the transaction indicator code will be carried in separate information elements of the S7 messages used in the network, and not in the same information element as the conventional DN. Note, the signaling format may be S6, S7, or any other type of format that can convey information.

A second type comprises a pseudo-number and may or may not also include FP codes and a transaction indicator or origin point distinguishing code. A pseudo-number comprises one or more of the following: a binary bit string having the form and length of a conventional DN but optionally including BCD digit codes that are not used in the prior art (this particular type is used in an embodiment example below); a conventional DN of possibly different length than as in the prior art, supplemented with additional prefix, infix and/or suffix digits that are carried in the same information element of an S7 message; a conventional DN supplemented by other numbers, which are carried in a separate information element (either newly defined or already defined in the prior art) of an S7 message; a number expressed in a non decimal based number system such as, but not limited to, the triskadecimal number system, or a representation or a mapping thereof into a binary number representation; an internal, and in some cases proprietary, ILAN appropriate to the switching node associated with the destination point; an internal or intrinsic, and in some cases proprietary, identification number appropriate to the end point equipment such as the mobile identification number (MIN), international mobile equipment identity (IMEI), temporary mobile service identity (TMSI) or other end point identifiers used with mobile, cellular or PCS telephones, secure telephone units (STUs such as STU-3), or answerback codes of data terminals, or the like; and finally a combination of more than one of these aforementioned types.

In one embodiment a table of origin-related FP codes is located at the network switching node associated physically with the OP, and the translation related thereto for origins are performed at the same place. The destination-related data tables and the translations related thereto are at an intermediate node called a service control point (SCP) node of the network, and not at the destination switching node. This particular choice is illustrated here because it is congruent with certain currently ongoing developments for LNP in the North American PSTN, and can therefore be implemented quickly with minimum immediate software development. The origin-related data and processes could equally well be located at an intermediate network node such as the SCP, or at the destination switching node. The destination-related processes could equally well be located at the destination or even at the origin switching node. Thus, the data table used for a translation need not be co-located with the site of the translation process that uses the table.

Each of these different choices of symbolic addresses would affect the amount of data transfer traffic in the network needed to establish a network path, and/or would permit the use of multiple copies of the relevant data lists and processes to help minimize some traffic or to provide greater reliability. For example, a substantially complete duplicate destination related translation table and process can be advantageously implemented at the destination switching node. In a cellular or PCS system, either or both of these data lists and processes could be resident at an existing processing center relevant to such a system, for example a home location register (HLR) or any other such subsystem. Any or all of these data tables and processes could equally be resident in switching node equipment such as a private branch exchange (PBX) and/or key system, or a separate computer connected to the telephone network by any one of several already-known computer-telephone interfaces, perhaps at the end user's premises. When such a switching node does not have signaling capability for S7 messages which, with appropriate modifications, are the messages used in a particular embodiment, appropriate new or modified alternative forms of signaling available in the relevant network may be used instead. Such alternatives, for example, could include primary rate interface (PRI) and basic rate interface (BRI) integrated services digital network (ISDN) signaling based upon signaling standard 1.451 and Q.931 and related substandards.

Figure 2:
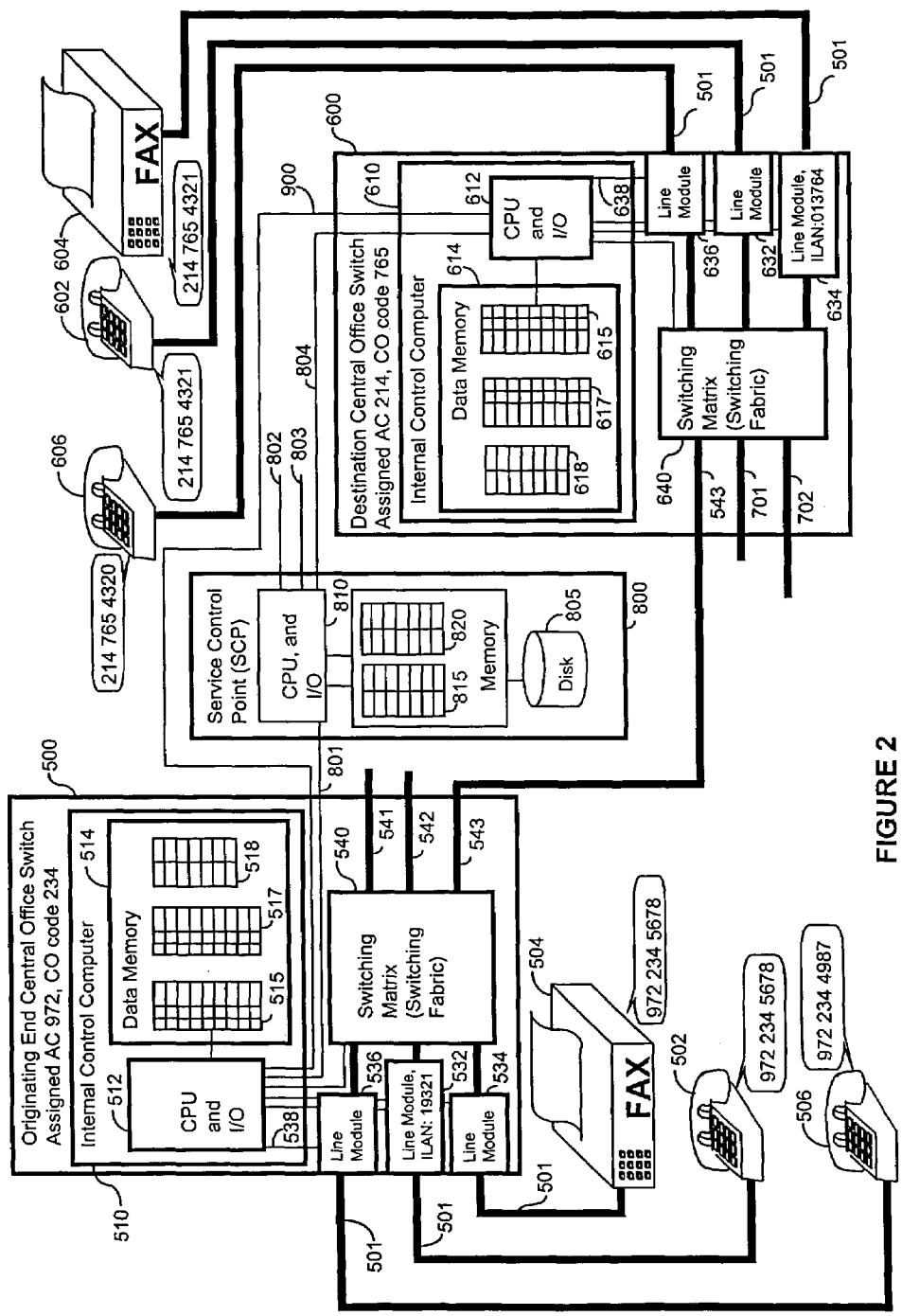
FIG. 2 illustrates an embodiment of the present invention in the telecommunication network.

FIG. 2 illustrates a particular embodiment of the invention in a telecommunication network. The PSTN is comprised of the following points: a first central office switch 500, a second central office switch 600, a first telephone handset 502 assigned to DN 19722345678, a fax machine 504 assigned DN 19722345678, a second telephone handset 506 assigned DN 19722344987, a third telephone handset 602 assigned DN 12147654321, a second fax machine 604 assigned DN 12147654321, a fourth telephone handset 606 assigned DN 12147654320 and a signal control point (SCP) 800. Various telephone lines 501 connect points 502, 504, 506, 602, 604, 606 with first CO switch 500 and second CO switch 600, respectively.

First CO switch 500 is assigned area code 972 and central office code 234, and contains an internal controller computer 510, a first line module 532, a second line module 534, a third line module 536 and a switching matrix 540. Internal control computer 510 contains a central processing unit (CPU) 512 and a data memory 514. Data memory 514 stores tables 515, 517 and 518.

Second CO switch 600 is assigned area code 214, and central office code 765, and contains an internal controller computer 610, a fourth line module 632, a fifth line module 634, a sixth line module 636 and a switching matrix 640. Internal control computer 610 contains a central processing unit (CPU) 612 and a data memory 614. Data memory 614 stores tables 615, 617, and 618.

In FIG. 2, two subscribers each have multiple telephone lines installed. A Subscriber "A" has telephone handset 502, and fax machine 504 coupled to first CO switch 500 by separate lines 501. A Subscriber "B" has handset 602 and fax machine 604 coupled to second CO switch 600 by separate lines 501. All of a particular subscriber's lines need not appear at a single CO switch as is shown in FIG. 2, but may appear at many different central offices throughout the PSTN. Software required for the embodiment of the invention are shown as resident in the two central offices and SCP 800.

The functional property description of a line includes one or more functional property (FP) codes. FP codes may be entered into data lists in various ways, some of these involving the human user of the line. Table 5 illustrates several examples of FP codes that can be entered by the user of the line from a telephone dial and that are, therefore, designed to begin with the symbols *2- (they could equally well begin with *3-, because *2 and *3 are not presently assigned for existing so-called vertical service codes in the numbering plan of the North American PSTN). Of course, the FP codes could begin with any symbols that the system would, or could be reprogrammed to, allow. As is well known in the art, the two digit sequence "11" may be substituted for "*" when dialing from a rotary dial telephone. Any entry code(s) that are compatible with the national numbering and dialing plans of a specific national PSTN may be used for this purpose, and need not be the precise codes and values shown in Table 5. Additional functional properties may be defined in the future, and some or all of the codes shown in Table 5 may be omitted in an embodiment.

FP codes can also be entered and modified by the user through the medium of a data terminal and data communication link to the relevant data lists, which can be accessed via data modem, Internet access, and many other devices well known in the art. A so-called graphic user interface (GUI) in conjunction with the data terminal is beneficial to continually display the current status of FP code entries and their implications. By use of such data terminal and/or GUI, the entry of FP codes can be made more convenient and less susceptible to human error. Furthermore, the representation of each FP need not be restricted to numeric codes, but instead descriptive names and/or graphic symbols or icons may be used. Whether using dial, GUI or other forms of entry, the user can also be prompted by synthesized speech confirming and/or prompting announcements while entering FP codes.

For clarity of explanation, we use the same representation of these codes internally and in Table 5. The internal form of the FP codes need not be the same as the external or entry form illustrated in Table 5. The use of the asterisk (*) and the succeeding digit 2 in these tables is also done for clarity of reading, and would not be used in actual internal codes. Thus, the North American PSTN is not a limitation in every embodiment. The length of each FP code is also not limited and not all codes need have the same number of digits, although only certain short codes are illustrated here. Therefore, there is no inherent limit on the quantity of FP codes that can be defined in the future.

TABLE 5

Examples of User-assigned FP Codes

| User-Assigned FP code and associated data value. | Significance or Category | Comment |
| --- | --- | --- |
| *2 | Substitute preset temporary FPs | Used only on per call basis. |
| *2200q . . . q: Primary Language | Human Language capability code. | Primary language designated by |
| *2233: French<br>*2234: European Spanish<br>*22413: Swiss German<br>*2244: English<br>*2249: German<br>*2252: Mexican Spanish<br>*2203: Esperanto | Individual codes are taken from international country code of nation or region where that language is predominant. Certain ambiguous codes (1, 41, etc.) are not permissible. | *2200q . . . q, used for internal recorded announcements or the like. |
| *23 | Fax machine Group 3 or Group 4 | Extensions 233 for G3 only, *234 for G4 only, etc. |
| *24 General Modem<br>*246 TTY/TDD | Data Modem and telecommunications device for the deaf. | Extensions for specific data rates and protocols may be used |
| *252: Administration<br>*253: Repair/warranty<br>*254: Personnel<br>*2542: Hiring<br>*2543: Verify employment<br>*255: Financial<br>*2552: Accounts Receivable and Billing Inquiries<br>*2553: Accounts Payable<br>*2582: Purchasing<br>*2583: Sales | Organizational or Departmental Activity Code | Many extensions for other departments and for specific industries may be defined. |
| *262: Selective answer [list]<br>*263: Selective call forward [list with distinct target number for each]<br>*264: Passcode access [code list]<br>*266X: transfer after X rings<br>*267: Connect to previous subscriber (similar to Automatic Intercept Service)<br>*268N . . . N: Call forward all.<br>*260: Selective block [list] | Access Control: Particularly when answering user pays for connect time (as in cellular/PCS) or does not wish to receive calls from all callers. Passcode has complementary significance for origin and destination entries. | Passcode access requires the caller to present a passcode to gain access. |
| *272: Human Assistant<br>*273: Answer Machine<br>*274: Cellular/PCS line<br>*275: Radio Pager line | Non-primary Lines | |
| *282: Child(ren)'s Line<br>*2822: Oldest Child<br>*2823: Second Child, etc.<br>*283: Spouse: wife<br>*284: Spouse: husband<br>*285: Male grandparent<br>*286: Female grandparent | Family Relationships | |
| *292: Dest Inputs Follow<br>*293: Orig Inputs Follow<br>*294: Read back FP | FP input help. Preinputs made before using *292 or *293 are understood to apply to both | FP code status read back is synthesized speech in designated |

TABLE 5-continued

Examples of User-assigned FP Codes

| User-Assigned FP code and associated data value. | Significance or Category | Comment |
| --- | --- | --- |
| code status *295: Clear all FP codes *296: Cancel last FP entry *297: Negate next FP entry. *298: Cancel next FP entry. | origin and destination. | primary human language. Negate example: *297*273 = "Don't connect me to answering machines." |
| *202: Retain all pre-input background FP codes when using a per-call FP entry. If negated, temporarily ignore all pre-input codes, using only FP codes entered per-call. *203: Connect if any FP codes match, rather than all. *204q . . . q: Set calendar/clock/day-of-week/etc. time intervals for validity of specific FP code sets, via parameters q . . . q. *205: Upon per-call origin FP code entry, suspend only those pre-input FP codes which are non-compatible. *208 Prefix for preset per-call FP group used with a *2 *209 Indicates following dialable DN is entered but not dialed | Control of alternative logical choices. Compatibility tables and origin-destination conflict rules also apply to matching operations. Notice that *297 prefix negates such orders. FP entry help to structure groups of entered FPs. | Permits user control of imperfect matches, handling of busy lines, etc. Origin and/or destination may govern in various cases when in conflict. Time interval settings allow automatic use of different pre-determined FP code sets at certain times of day, on certain days of the week, etc. |

In addition to the FP codes that are under the control of the user and illustrated in Table 5, further FP codes may be used, under the control of the network administrator only. Table 6 shows a few proposed FP codes of this type. The numeric value of these administrator-assigned FP codes need not begin with *2- because they are not user-entered from a dial and are not visible to nor under control of the user.

TABLE 6

| Administration-Assigned FP code and associated data value. | Significance | Comment |
| --- | --- | --- |
| 60: | Destination: DN not in service. | Network can play informative recording in primary language of originator. |
| 70: q . . . q | Destination: This explicit DN is no longer active at nominal switching node. Its pseudo-number is q . . . q | Similar Result to Local Number Portability. |
| 80: N . . . N | Destination: The DN of this line was formerly used by a subscriber whose current DN is N . . . N | Similar to Automatic Intercept Service (AIS). |
| 90 | Origin: This line is authorized to originate emergency traffic. | Used only for selected governmental or emergency services. |
| 91 | Destination: traffic to this line is presently restricted due to a temporary local emergency. | Network can play an informative recording to explain the situation and prevent continual retries. |

The network administration may also automatically set certain user-controlled FP codes at installation time, if so desired. For example, a default human language code may be set by the administrator for certain areas so that the customer who does not like technology or does not wish to enter the FP codes of this invention may nonetheless gain the advantages thereof. It should also be understood by those skilled in the art that some FP codes such as *2 or *292 or *293 are not communicated over the network.

When a call is originated, as will be explained in more detail below, the call processing message to establish the call, a modified IAM message in S7, will comprise the appropriate origin FP codes. These origin FP codes are analyzed by the software controlled control computer associated with the destination FP translation process, to compare with the destination FP codes for each destination point having that particular explicit DN.

When there is only one destination line installed with the relevant explicit DN, the objective of the FP analysis process is to proceed to ring that line only where there is an appropriate match of the relevant FP codes. When there is not, the line should not ring and an appropriate recorded announcement may be played to the originating line, in the originator's primary language or by a signal compatible with the origin point terminal equipment, to explain the reason. This will have the beneficial effect of neither producing a connection path though the network nor using further network resources when no compatible destination line is in place. Further details on the process of matching the FP codes are given below.

When two or more destination lines are in service with the same explicit DN, the objective of the process is to find the first un-engaged destination line among the destination lines that have matching relevant FP codes and then to ring or otherwise cause alerting status of that DP and establish a network path connection if it answers. If there is no DP, among the plurality of DPs, with compatible FP code(s), the handling should be as described for no match in the previous paragraph for a single DP. If there are multiple DPs with matching FP codes, the precise choice of DP among the multiple DPs with matching FP codes may be made by sequential hunting (also known as "roll-over" or "group hunting") by examining the multiple DPs with matching FP codes in a predetermined order, and then using the first non-busy DP as the particular destination. If all the multiple DPs with matching FP codes are busy or otherwise unable to receive a connection, the attempted call may be treated in the traditional manner of a busy status.

In particular embodiments, when there are a plurality of OPs or a plurality of DPs that bear the identical explicit DN and FP code(s), and are thus otherwise ambiguous, a further data value, described as the transaction indicator code, may be included in the relevant messages in the network, one such transaction indicator code for each end that has a plurality of potentially otherwise ambiguous end points. The transaction indicator has the function of preventing ambiguity of identification of the proper physical end point in cases where such network features as call trace or call completion to busy subscriber (CCBS) is used.

The transaction indicators, in one embodiment, may be assigned in the chronological order in which destination points are installed or placed into service, drawing the transaction indicator codes without duplication from the pool of numbers 1, 2, 3, 4, etc. One could also assign a transaction indicator to each relevant end point in a group dynamically as a connection setup process begins to affect the DP, drawing the transaction indicator codes without duplication from a pool of numbers 1, 2, . . . M, (where M is the number of potentially otherwise ambiguous end points in the group already installed at the relevant switching node), and then returning each such transaction indicator code value to the pool dynamically as each such connection or CCBS state ends.

In preparation for operation, the administration and/or the user enter(s) FP codes relevant to telephone lines connected to telephone handsets 502, 506, 602 and 606, and for fax machines 504 and 604. The administration and user input software has appropriate data access to both data tables 514 and 614 via data communication techniques well known in the art. The user lifts the handset, and, upon hearing a dial tone, enters the desired FP code(s) in the appropriate sequential order, and then hangs up. Once the subscriber(s) and/or administrator has/have entered the appropriate origin and destination FP codes, the codes that are relevant to origination from first CO switch 500 are stored in table 515 and from second Co switch 600 are stored in table 615, and the codes that are relevant to destination are stored in table 815. The input entry and storage of the FP code(s) are controlled by processors 512, 612 and 810, by processes well known to those skilled in the art. The transfer of destination related FP codes from control computers 510 and 610 to control computer 810 and disk 805 will utilize newly defined but straightforward S7 message formats, by techniques well known in the art. The transfer of FP codes from control computer 510 to data table 515 and from control computer 610 to data table 615 is likewise well known in the art.

In operation, when a user wishes to contact a person at telephone handset 602, the user lifts telephone handset 502, and line module 532 detects that its assigned point has been activated. By devices and methods well known in the art, the telephone handset 502 is connected to an internal dial tone generator (not shown), and the user dials the explicit DN 1 214 765 4321 of the desired destination point, telephone handset 602. Take note that fax machine 604 connected to second CO switch 600 also has this same explicit DN as well.

Upon completion of the dialing, internal control computer 510 of first CO switch 500 utilizes table 515 to obtain the data values needed for setup of a connection path through the network. Part of the contents of table 515 in FIG. 2 are illustrated in Table 7.

TABLE 7

| ILAN | IN/OUT of service | explicit DN (last 4 decimal digits) | FP origin code (s) |
|---|---|---|---|
| 19317 | 1 | 8114 | *220044*282 |
| 19318 | 1 | 5678 | *23 |
| 19319 | 1 | 4987 | *220044*2252*255 |
| 19320 | 0 | — | — |
| 19321 | 1 | 5678 | *220044 |

Table 7 discloses that ILAN 19321 corresponds to the (originating) telephone handset 502, that it is in service, that it has been assigned explicit DN 1 972 234 5678, and that its FP code indicates it is a voice line with English as the principal (and only) language. ILAN 19318 corresponds to the fax machine 504 of first CO switch 500. It also has the same explicit DN 1 972 234 5678, but its FP code indicates it is a fax machine. ILAN 19319 corresponds to the remaining telephone handset 506 connected to first CO switch 500. It has explicit DN 1 972 234 4987, and is a voice line with English as the principal language, but will also use the Mexican Spanish language, and desires to reach the financial department of any destination. ILAN 19317 corresponds to another telephone not illustrated in FIG. 2, which is assigned explicit DN 1 972 233 8114, has English as its principal language, and wishes to reach a child's line at a destination. ILAN 19320 is not in service at this time.

Table 7 is simplified in several ways for clarity of exposition. Many PSTN CO switches are large enough to have 30,000 telephone lines, or even more, and would thus be assigned two additional CO codes, such as 233 and 235 in addition to 234. In such a large switch, Table 7 would use the last 5 (or more) rather than the last 4 decimal digits of the explicit DN to unambiguously identify each line that did not use FP codes. In a switch wherein only a limited number of telephone lines have the special FP codes, methods could be applied to optimize data structures to avoid wasted memory space corresponding to "empty" FP spaces, even though not illustrated explicitly in Table 7. For example, the column corresponding to the FP values in Table 7 could be replaced by a "column" which carries a binary number pointer. This pointer is set to the special value 0 for "rows" which have no assigned FP values. A non-zero pointer value would be entered if FP values are assigned to the telephone line corresponding to that particular row. Such a non-zero pointer is the "index" of a separate table comprised of FP values (not shown). At a later phase of installation, when the majority of telephone lines have FP codes assigned, the structure of the table can then be changed to the form represented in Table 7, with all the origin FP information appearing in the same table as the DN digits.

In a cellular or personal communication system (PCS) system, other internal data elements, often proprietary, play the same role as the ILAN does in a wired telephone switch. However, due to handoffs, the ILAN-equivalent in a cellular or PCS system changes from time to time as the telephone involved in a conversation moves from cell to cell and is consequently in radio communication with different base radio channels in different cells. Due to their design, a cellular or PCS switch can maintain a connection despite the timely changes in the ILAN, and the changes in internal ILAN in such a situation do not prevent the operation of the invention.

Returning to the operational example, at this point in the operation of the invention, internal control computer 510 has available within it the dialed explicit DN of the desired destination 1 214 765 4321, the explicit DN of the origin line 1 972 234 5678, and also the FP code *220044 of the origin line. Internal control computer 510 then generates a modified query, initial address message (IAM), or other appropriate S7 message comprising these data elements and a transaction identifier code, and sends the message to SCP 800 via data link 801. The message is "modified" because a message that only includes the destination explicit DN and the origin DN is already well known to those skilled in the art and used in S7 signaling to begin the connection setup process. Upon receipt of the modified message, processor 810 of SCP 800 examines the internal translation data table 815, which is represented in part in Table 8.

TABLE 8

| Explicit DN | Destination FP Code (s) | Destination Number |
|---|---|---|
| 1 214 765 4320 | *23*2583 | 1 214 765 8h24 |
| 1 214 765 4321 | *220044 | 1 214 765 4321 |
| 1 214 765 4321 | *23 | 1 214 765 1t27 |
| 1 214 765 4321 | *275 | 1 817 6h1 2r5t |
| 1 214 765 4322 | (none) | 1 214 765 4322 |

Table 8 illustrates the logical organization of a data record for an explicit DN. Table 8 shows three hypothetical data records, one for 1 214 765 4320, one for 1 214 765 4321, and one for 1 214 765 4322. The record for 1 214 765 4320 has one sub-sections, the record for 1 214 765 4321 has three sub-sections, and the record for 1 214 765 4322 has one sub-section. The explicit DN "1 214 765 4321" is repeated in each sub-section of Table 8 for convenience of the reader of this description. In an actual data table, however, this identification addresses would not necessarily be repeated as shown here. In addition, although the entries in this table are shown here using alphanumeric characters, the internal representation in data memory 114 is typically via binary symbols. These binary symbols may be grouped into octets or bytes that each represent an alphanumeric character symbol.

Processor 810 examines table 815 for entries that have the explicit DN 1 214 765 4321. The representation of a part of table 815 in Table 8 discloses that there are three such "row" entries. Processor 810 then examines the FP codes for each row, and compares them with the FP code *220044, which is contained in the modified message, and finds a match in the first of the three entries. Processor 810 then generates an S7 message that is returned to internal control computer 510 of first CO switch 500 via data link 801. This message comprises the destination number 1 214 765 4321, taken from the appropriate row entry of table 815, as well as other data elements in the modified message, and some other data elements as well. (Note that some of the entries in the third column of Table 8 are pseudo-numbers—those having the letter symbols h, r, and/or t, which explained below.) This process of returning a different value in the format of a DN is known as a global title translation, because, in general, a different and distinct number value in the format of a DN is returned as a result. In this particular example, however, the value returned is the same as the explicit DN given as an input component, but a later example will be distinct. Further details of the process and examination of the matching FP codes are also described below. Note that, in other embodiments, the third column in Table 8 may be composed entirely of DNs, some matching the explicit DN in the first column and some not.

After receiving the translated pseudo-number DN, internal control computer 510 then produces a new IAM message, which contains the translated pseudo-number. This new IAM message is sent to internal control computer 610 in second CO switch 600 via data link 900. In most large PSTN systems, however, a direct data link does not usually exist between all possible origin and destination switches, so numerous data switching nodes called signal transfer points (STPs), perform the function of a so-called packet data switch, and provided for the data links, not illustrated here. Following receipt of the new IAM message at internal control computer 610, a further exchange of messages takes place between first CO switch 500 and second CO switch 600.

The result of these message transactions is that a channel for telephone traffic is set up between first CO switch 500 and second CO switch 600 via trunk 543. Note, in most large PSTN systems, a direct trunk link does not exist between all possible origin and destination switches, so numerous transit trunk switching nodes are provided for the trunk links. These switches are directly or indirectly controlled by the S7 call processing messages in a manner which is well known to those skilled in the art, and their presence and activity is the technical basis of the long-distance telephone switching capability of the PSTN. Once the destination point answers, the connection established in second CO switch 600 carries the channel from trunk 543, via switching matrix 640, to line module 632 and the appropriate destination telephone, telephone handset 602. This connection is established because internal control computer 610 uses table 617 to determine the correct ILAN for the incoming pseudo-number 1 214 765 4321. A portion of table 617 is represented by Table 9.

TABLE 9

| Pseudo-number (last 4 digits) | IN/OUT of service | ILAN | Comment: |
|---|---|---|---|
| 1t27 | 1 | 013764 | fax 604 |
| — | — | — | several rows omitted |
| 4321 | 1 | 013763 | telephone 602 |
| 4322 | 1 | 026173 |  |
| — | — | — | several rows omitted |
| 8h24 | 1 | 013762 | telephone 606 |
| 8h25 | 1 | 013764 | another pn uses same fax line |
| — | — | — | several rows omitted |

The row from Table 9 that is relevant to the connection described in the previous paragraphs is the row having pseudo-number 4321 and ILAN 013763. Internal control computer 610 will ring line 501 having ILAN 013763 (if it is not already busy), and when a user of that line answers the telephone handset 602, a connection will be established through switching matrix 640 between trunk 543 and line module 632.

One benefit of this embodiment is visible when the originator makes a call from the fax machine 504 at first CO switch 500. In this case, a sequence of events occurs that is similar to that just described, but with the following significant distinctions. When the originator uses fax machine 504 to dial the same destination DN used in the previous example, namely 1 214 765 4321, internal control computer 510 sends an appropriate S7 message, such as a modified first IAM message or a data query message, to SCP 800, but the FP code content of the message in this instance differs from the message content in the previous example. In the present example, the FP code is *23, which comes from row ILAN 19318 of Table 7. The transaction indicator will, in general, be different from the previous example as well. Due to the different FP code value, when a translation is performed by SCP 800, the result of the translation will be the pseudo-number value 214 765 1t27, arising from the "row" in Table 8 having that particular value in the pseudo-number "column." An appropriate message with the thus translated value 1 214 765 1t27, which, as previously indicated, is really "translated" in this example and not merely equal to the input explicit DN, is then returned to internal control computer 510. Internal control computer 510 now sends a second modified IAM message to internal control computer 610 using data link 900. In this instance, due to the distinct pseudo-number 1 214 765 1t27, the internal control computer 610 will ultimately establish a connection to line module 634 having ILAN 013764, and thus to (destination) fax machine 604.

As illustrated in the previous two examples, two or more destination telephone lines may have the identical explicit DN, namely 1 214 765 4321, but nonetheless, originators who dial this same explicit DN from distinct origin points, having different predetermined origin FP codes, will each be connected to the respective correct distinct network destination point(s). To further clarify the explanation, we now explain the significance and use of the letter symbols t, h and r in the pseudo-numbers, and certain other significant aspects of the various embodiments.

When a DN is communicated in the appropriate information element data field of a prior art S7 message, each decimal digit of the dialed number is expressed as a so-called binary coded decimal (BCD) four-bit code. The telephone industry standard BCD codes are shown in Table 10.

TABLE 10

S7 BCD Codes

| 4-bit Binary-Coded-Decimal Value | Significance of corresponding BCD value in S7 signaling called or calling party number information element digit |
|---|---|
| 0000 | digit 0 |
| 0001 | digit 1 |
| 0010 | digit 2 |
| 0011 | digit 3 |
| 0100 | digit 4 |
| 0101 | digit 5 |
| 0110 | digit 6 |
| 0111 | digit 7 |
| 1000 | digit 8 |
| 1001 | digit 9 |
| 1010 | Not assigned (ten: here called t) |
| 1011 | "eleven", or dial button * |
| 1100 | "twelve", or dial button # |
| 1101 | Not assigned (thirteen: here called h) |
| 1110 | Not assigned (fourteen: here called r) |
| 1111 | Does not represent a digit. Used only as the "end of digit string" indicator |

Table 10 indicates that three of the BCD codes are forbidden or not assigned in the prior art. In the embodiment just now given, these three codes are instead used and are arbitrarily assigned the three letter symbols t, h and r as indicated in the table, to form one of the types of pseudo-numbers. This type of pseudo-number is convenient for initial implementation of the invention because it can make use of the same information element used in the prior S7 art for the traditional DN, having the same length and structure, with the exception that some of the digits can be the previously forbidden four-bit BCD codes t, h or r. One may describe this as a triskadecimal number form of the DN, where the word triskadecimal describes a radix 13 number. When such numbers are expressed digit by digit using a four-bit BCD code for each digit, it is only necessary to define their relative order for the purpose of properly ordering the entries in a consecutive list. The order of the traditional decimal digits are 0<1<2<3<4<5<6<7<8<9 with <t<h<r following.

At a later time, the network can evolve from the use of triskadecimal numbers to the use of one or more of the aforementioned types of pseudo-numbers so as to have greater flexibility and more DP capacity associated with each switching node. In particular, in portions of the network where the codes "1011" and "1100" do not already have conflicting uses, they may also be used, thus allowing a base fifteen or quincidecimal digit value. When a data list such as table 517 must be constructed in data memory in a consecutive order described by a binary index corresponding to a triskadecimal index number (and corresponding to the pseudo-number column of Table 9), without gaps in the consecutive entries, then an alternative mapping of the triskadecimal numbers onto the binary numbers is desirable to prevent such gaps of wasted or unused memory. Using the same order of the three letter symbols described in the previous paragraph, then the consecutive mapping for the three letter symbols: t=decimal 10; h=decimal 11; r=decimal 12 and the ten decimal digits in their traditional values. Consider a four digit triskadecimal number. The translation between the triskadecimal digit representation and the consecutive binary or decimal representation of the same number is then expressed by the algebraic formula:

$$CB = d_3 \cdot (13)^3 + d_2 \cdot (13)^2 + d_1 \cdot (13) + d_0 \sim (13)^0$$

where CB is the consecutive binary or decimal translation of the triskadecimal value, $d_3$ through $d_0$ represent the four triskadecimal digits in decreasing significance order, or left to right order as conventionally written, (13) is the decimal number thirteen, and superscript numbers represent usual exponents, that is the third, second, first and zero- the power. A small portion of the list of 4-digit triskadecimal numbers and the decimal equivalent of the binary translation of these numbers is shown in Table 11.

TABLE 11

| Four-digit triskadecimal number | CB, the Decimal representation of consecutive binary mapped value |
|---|---|
| 0rr9 | 2193 |
| 0rrt | 2194 |
| 0rrh | 2195 |
| 0rrr | 2196 |
| 1000 | 2197 ( = 13$^3$) |
| 1001 | 2198 |
| 1002 | 2199 |

It is convenient, but purely coincidental, that the largest 4-digit triskadecimal number, rrrr, is equal to decimal 28,560, which is close to the actual traditional physical line capacity of many CO switches, namely decimal 30,000. Therefore, if desired, it is both feasible and convenient to install up to 28,561 distinct telephone lines in a CO switch of such capacity, using only one CO code and the standard 7-digit decimal North American Numbering Plan, and yet assign a distinct identity to each line, provided that 18,561 of these 28,561 lines have distinct FP codes and each one of these shares an explicit decimal DN with others. If triska-decimal CO codes are used, then extra CO switch capacity can likewise be added to the network by assigning such non-decimal CO codes to such extra switches, which appear as "phantom" network switch nodes. DPs on such phantom switches can only be reached by dialing a related explicit decimal DN for another switch node and utilizing the translation process.

Furthermore, certain line appearances in a switch need not share the same decimal CO code used by the explicit decimal DNs resident on that same switch. An example of this can be seen in Table 8. The row having pseudo-number 1 817 6h1 2r5t is in a phantom switch with a non-decimal CO code 6h1 and in a different area code, although its explicit DN is 1 214 765 4321. FP code *275 indicates that it is a radio pager line. It is convenient to install pager lines on such a phantom switch. Origination callers who wish to reach the radio pager of the person having explicit DN 1 214 765 4321 can do so in more than one way. First, such an origination caller can set an origin FP code *275 (either permanently or on a per-call basis, explained below) and then dial 1 214 765 4321. This first method is compatible with the aforementioned FP code in Table 8.

The second method does not require the origination caller to take any steps other than dialing 1 214 7655 4321, but it does require the user of these destination lines to set up FP codes to cause a transfer on ring-no-answer from the nominal primary line to the radio pager line. Table 12 is a modified version of Table 3 showing the appropriate code changes on the line with pseudo-number 1 214 765 4321. The code *2663275 indicates that a call transfer will occur after 3 rings, and the digits 275 therein indicate that the transfer target is the pager line.

Again there are several alternative embodiments of the basic process to control the call delivery. In one alternative, the relevant FP codes for both the voice line and the pager line are passed to the nominal voice destination switch, such as first CO switch 600, along with the translated pseudo-number, and the destination switch then initiates the transfer via a global title translation and exchanges messages between SCP 800 and the origin switch, by a "crank back." A crank back route setup involves a tentative call processing connection to a temporary intermediate destination, followed by a retraction of the call and a second call setup to a different destination in response to signals which indicate that the first destination is not appropriate.

TABLE 12

| Explicit DN | Destination FP Code(s) | Destination Pseudo-Number |
|---|---|---|
| 1 214 765 4320 | *23*2583 | 1 214 765 8h24 |
| 1 214 765 4321 | *220044, *2663275 | 1 214 765 4321 |
| 1 214 765 4321 | *23 | 1 214 765 1t27 |
| 1 214 765 4321 | *275 | 1 817 6h1 2r5t |
| 1 214 765 4322 | (none) | 1 214 765 4322 |

As another alternative, the destination switch can use conventional call forwarding to pass the payload channel from the origination caller on the origin switch into the destination switch via a trunk, such as trunk 543, and then out of the destination switch via another trunk, such as trunk 702, towards the destination switch having area code and CO code 817 6h1, which is the ultimate destination switch (not shown).

In yet another alternative, the crank back process can also be initiated due to a time-out message from the nominal destination switch to SCP 800, by a newly defined S7 message designed for this purpose. This alternative only requires SCP 800 to pass the FP data regarding the voice line to nominal destination switch, since this destination switch does not need to communicate directly with the origin switch in this alternative embodiment.

In addition to supporting multiple DPs with the same explicit DN, certain embodiments also support multiple DNs for a single DP. Table 9 shows two distinct rows that both have the ILAN value 013764. The two relevant lines have different pseudo-numbers, and there are different explicit DNs involved in these two pseudo-numbers, although both such pseudo-numbers are assigned to entries which have a *23 FP code indicating a fax machine. In this case, two or more different people can share the same fax machine, which is a very desirable way to avoid both number exhaustion and also to avoid installing more lines and more fax machines than is required by the amount of fax traffic. If there is more traffic than one fax machine can handle, additional fax lines may be installed in a so-called hunt group.

Particular embodiments also encompass a plurality of explicit DNs corresponding to the same ILAN and physical line, but with distinctive ringing cadences (or in general distinctive alerting, in the sense of distinctive number codes used in ISDN or PCS alerting messages). These embodiments may include an implementation in which several pseudo-numbers describe the same ILAN and physical subscriber line appearance, but which likewise are distinguished by distinctive ringing or the like. The embodiments may also include an implementation in which the internal destination is designated by so-called "spill forward" digits from the PSTN to the destination equipment. Such digits are typically represented by DTMF tones or by digitally coded signals.

With regard to proper matching of origin and destination FP codes, which occurs in SCP 800 in the embodiment of FIG. 2, certain properties of the matching algorithm are desirable for optimum user convenience. The actual matching algorithm in a particular embodiment may differ from the algorithm proposed here without departing from the scope and spirit of the present invention. Certain portions of the matching process may alternatively utilize serial or parallel and substantially simultaneous computation steps.

One embodiment of a matching algorithm is as follows: First, for each DP examined, the quantity of FP codes comprised in the message from the OP is compared to the quantity of FP codes comprised in the destination list for each DP examined, and the smaller set of such codes is identified. Second, certain FP codes that are in a special form having a significance not essential to issues of compatibility are then translated, for purposes of the matching algorithm only, into an equivalent FP code that has a form suitable for matching. One example of this is the code *220044, which indicates that English (44) is the principal language. This particular code is replaced by *2244 for purposes of matching, since the principal status of English in this case is immaterial to the matching process, although it is significant to selection of the correct primary language for playing a recorded voice announcement. Third, then a code by code comparison is made for each code in the smaller set of codes, against all the codes in the opposite or larger set of codes.

When performing this comparison, certain FP codes may be physically compatible with each other, even though they are numerically distinct. This can occur in cases of human language, technical end equipment and other contexts. In a technical context, all presently available G4 fax machines are also backward compatible with G3 fax machines, so the FP codes for both should be considered to be compatible until and unless some change in the characteristics of available fax machines occurs. If in the future some G4 machines are not G3 compatible, then the end point with such equipment must be appropriately indicated with only the FP code *234, while the ends with fax machines compatible with both standards can be indicated with both codes *233 and *234. In such cases a more general method that does not require the end user to be aware of and enter all such codes, is the use of a compatibility translation process during the third step of the matching algorithm. This process may be described by a pre-determined compatibility translation table, but even when described in a table for purposes of documentation, the actual internal process may not involve table look up. An example of such a compatibility table is illustrated as Table 13 for the limited list of human languages previously given. An intersection of a row and column having the notation OK indicates compatibility, while a blank indicates no compatibility. Note that European Spanish and Mexican Spanish are compatible with each other (although they are different dialects of the Spanish language), while Swiss German is a dialect that is not mutually comprehensible by speakers of ordinary German. Of course, an educated native of the German-speaking area of Switzerland learns to speak ordinary German in school and would therefore enter both FP codes for his or her telephone line. However, a small number of Swiss German speakers (for example, on a line used only by a small child) may have no facility with ordinary German. Although this sample compatibility table is symmetrical about the main diagonal, there are situations involving types of compatibility where the two off-diagonal entries for corresponding pairs will not both be the same. Therefore, in general, non symmetrical off-diagonal terms need not be identical.

determined reject list. Destination FP code *264 requires that a pass code data element comprised in the origin S7 message match up with an entry on a predetermined destination list. This FP code permits an originator who is originating a call from an OP other than the normal OP to enter a pass code by the symbol sequence *264q . . . q, and thus provide identification and authentication to establish a connection securely when calling from an origination telephone line whose explicit DN is not predetermined, such as a public coin telephone.

If the authentication is not valid, the call may be rejected (according to the particular embodiment) with an optional appropriate recorded announcement or message for the originator, regardless of the other FP code matching results.

The fourth step in the matching algorithm is, in the default case, to declare a match if all of the FP codes in the smaller set have a matching code in the larger set. This is the conclusion of the default matching algorithm. However, in addition to the default of declaring a match only for the case in which all the FP codes in the smaller set each match a corresponding code in the larger set, certain alternate choices may be made in one particular embodiment, according to preferences expressed by the origin and/or destination presence of FP code *203. This code indicates that the user wants to declare a match in step 4 if there is/are one or more FP codes that match between origin and destination FP codes. If, among the origin and destination FP codes, the origin FP codes include *203 although this code does not appear among the destination FP codes, a particular embodiment allows a change from the default (match all) to the special case (match at least one). However, an embodiment that uses a different resolution of this conflict of code *203 does not depart from the spirit and scope of the present invention.

When there are a plurality of DPs that have the identical explicit DN and FP code (s), a particular DP among the plurality of DPs may be chosen by one or more of the following alternative methods: first, because a specific destination transaction indicator data element in the origin message specifies that particular DP; second, because the

TABLE 13

|  | *2233: French | *2234: European Spanish | *22413: Swiss German | *2244: English | *2249: German | *2252: Mexican Spanish | *2203: Esperanto |
|---|---|---|---|---|---|---|---|
| *2233: French | OK | | | | | | |
| *2234: European Spanish | | OK | | | | OK | |
| *22413: Swiss German | | | OK | | | | |
| *2244: English | | | | OK | | | |
| *2249: German | | | | | OK | | |
| *2252: Mexican Spanish | | OK | | | | OK | |
| *2203: Esperanto | | | | | | | OK |

Note that certain FP codes require the testing of yet other data elements or sub-elements. For example, destination FP codes *262 or *263 require that the origin explicit DN match up with one entry on a pre-determined destination list. Destination code *260 requires, to the contrary, that the origin explicit DN not match with any entry on a prefirst matching DP is a busy destination and the aforementioned sequential hunting process finds another DP within the plurality of DPs by a sequential search in SCP 800; third, because the first matching DP is a busy destination and the aforementioned sequential hunting process finds another DP within the plurality of DPs by a sequential search in the destination switch node, such as second CO switch 600. The second aforementioned alternative requires that the busy or idle status of each line be communicated from second CO switch 600 to SCP 800 by appropriate S7 messages, so that the SCP is continually aware of which such lines are busy or idle. The third aforementioned alternative permits a minor variation on the structure of the translation tables in SCP 800. In this case, only one line entry is required in FP translation table 815 to represent a plurality of DP lines in second CO switch 600 or other destination switches (not shown) that have the identical explicit DN and the identical FP codes.

The one destination pseudo-number comprised in the one line entry of table 815 is the appropriate pseudo-number that will translate into one of the plurality of appropriate line appearances in second CO switch 600. The line appearance can, in a first sub-alternative, be the so-called pilot line of a sequential hunt group, or in a second sub-alternative, can be any line appearance within the scope of a so-called circle hunt. This latter alternative with either of its two sub-alternatives reduces the complexity of the SCP software and modifies the message traffic activity in the network. Any or all of the alternative embodiments described in this paragraph are within the scope and spirit of the present invention.

Certain telephone lines are used for different origination purposes on different occasions. Another embodiment of the invention, therefore, includes the following capabilities in addition to those already recited with regard to the prior embodiment. The following embodiment requires the same types of entry and modification of the IAM and other S7 call processing messages that have been described.

Consider a line used primarily for voice origination, but occasionally used for a fax origination instead. To facilitate such multiple uses of the same line, the user would set the background FP code by lifting the handset for the first time on a newly installed telephone line, dialing for example *220044, and then hanging up. This sets both the origin and destination codes to be *220044. Alternatively, the user could lift the handset for the first time and dial *293*220044, which sets the origin FP code to *220044 but does not set a destination code. The background origin FP code is now set for English language voice, and the user may originate all such calls by merely dialing the explicit 7 digit or 11 digit destination DN in the customary way (or longer digit strings for calls outside of North America, etc.).

On an occasion when the originator wishes to make a fax call to explicit DN 12125554321 from this same line, the originator may enter distinct FP code entries as a prefix to the explicit DN entry. Note that entry as a suffix or infix to the explicit DN, or other forms or combinations, may be used with, or instead of, a prefix, particularly in non-North American numbering plans. Thus, the dial on the fax machine would be used to dial the following: *23**12125554321, and then wait for the ringing and connection to the destination fax machine. This will have the normal result of temporarily replacing the background origin *220044 FP code by *23 for this call only. On subsequent calls where the explicit DN is dialed, the background *220044 FP code will be back in place.

Other users, however, may have other FP codes in place that they desire to remain in place although certain other FP codes are changed for one call only. Consider an originator who has previously set the background origin codes *2233 and *255, indicating that the originator speaks the French language and wishes to reach a financial department. If this originator still wishes to reach a financial department, but wishes to make fax call rather than a voice call, there are several alternative ways to do this. Only one of the alternative methods will be described for the sake of brevity. First, this user must perform an entry which sets the mode of the system so that all non-compatible codes will be suspended when a per-call FP entry is made, but any codes which have no compatibility conflicts with the newly entered FP codes will be retained. This mode change is achieved by lifting the handset, and upon hearing dial tone, entering *205, and then hanging up. After doing this, when a call to a fax machine with explicit DN 1 212 555 4321 is desired, the user lifts the handset and dials the following: *23**12125554321, and then wait for the ringing and connection to the destination fax machine. This will have the normal result of temporarily replacing the background origin *220044 FP code by *23 for this call only, but leaving the *255 code in place. In general, voice codes are incompatible with data modem codes, and likewise with fax codes, although other cases exist as well. Departmental and family relationship codes are mostly fully compatible with the three categories of voice, data, and fax.

It is, of course, permissible to have in place both the *220044 English language voice FP code and also the *23 fax code as origin codes, but this will cause the actual call destination point to be governed by the FP codes in place at the destination, which may or may not achieve the result desired by the originator. When the originator specifically uses only non-incompatible origin FP code(s) on each originated call, a connection to the desired destination is more sure. Note that when a single line has both a voice telephone and a fax machine on it simultaneously, for convenience in receiving both types of calls, it is feasible to set both types of FP destination codes. The line will then ring for both voice calls (in English) and fax calls. In such a case, the fax machine should preferably have a loudspeaker installed to allow persons nearby to hear the beginning of each call so they can answer a voice call manually.

When a long sequence of FP codes are needed to properly set the temporary status for a single call, and this particular sequence is used repeatedly, it may be "recorded" by the following sequence of entries: lift the handset, enter **\*208**, then enter the sequence of FP codes to be recorded, then hang up. After this is done, the entire sequence of FP codes may be invoked as a prefix *2 proceeding a dialed DN, as in this example *2**12147654321. It is anticipated that a suitable machine can be used to enter such per-call FP codes as well as a human number originator.

In addition the entry of the FP codes in advance of other activities, and in addition to entry at the time of call origination, a third alternative of entry near the time of answering a call is of significance, particularly during a transition calendar interval when only a portion of the network contains the FP code functionality. For various reasons, an incoming call may cause ringing of the "wrong" destination point telephone line. Upon answering the ringing, some audible status of the telephone channel may indicate or strongly suggest that the call is better handled by an alternative line. For example, a human user, upon answering a call, may hear any one of the following audible conditions indicating or suggesting various types of non-voice calls: first, a periodic beep indicating an originating fax machine; second, a substantially continuous modem tone or a hissing sound indicating a PCM modem; third, a silence or substantial silence with only normal line noises, possibly indicating a modem call wherein the originating modem is awaiting an audible tone from the answering modem.

In any case, the following capabilities constitute a further alternative manner of entry of origin FP codes applicable to such calls. These capabilities involve the same data entry steps and the modification of some of the IAM message data fields previously described, together with a return of the modified IAM message to either the SCP or the origin switch as previously described in the case of crank back connections. Alternatively, if the destination related FP data base and process are accessible to the destination control processor (such as internal control computer 610), the transfer of the connection can be done via call forwarding either within the same destination switch when the ultimate destination line is within that same destination switch, or via an outgoing trunk when the ultimate destination is in a distinct destination switch, or via crank back.

In operation, when the destination user answers a call that she desires to transfer or re-direct to an alternate destination, the user must first do a so-called "flash" operation in a particular embodiment using existing telephone switching technology. For an analog telephone line, this requires operating the cradle switch (also called a "switch hook") for a brief time, typically between 1 and 2 seconds. In an analog telephone, this disconnects the dc loop current for such a time interval. In an ISDN or a proprietary digital telephone, the user presses an appropriate push button, which produces a digital message to the control processor of the switching node, via the telephone line. In either case, the result is that the incoming call is placed on hold, and the answering user hears a "fresh" dial tone. At this point, the subscriber may enter the desired FP code(s) and then hang up the telephone. The result is that the incoming call is re-directed to an alternate line having the appropriate FP destination code, which new destination line then rings and possibly answers. The result is due to either a crank back or call forwarding switching operation with a modified IAM message now containing the newly entered FP codes with non-compatible FP codes removed, and otherwise as herein described.

For clarity, consider the example of a ringing voice line which is answered and reveals the periodic audible tone from an originating fax machine. The person who answers makes a cradle switch flash, and upon hearing the dial tone, dials *23, and then hangs up. Presuming that the voice line is a member of a group of lines with a shared explicit DN and the group contains at least one non-busy fax line, the call will transfer to the fax line. If not, the call will stay on hold at the voice line, and the voice line will continue to ring for a predetermined time until answered. It is anticipated that a suitable machine can be used to respond to audio frequency characteristics of an answered call and enter such FP codes as well as a destination user.

Particular embodiments of the present invention produce the previously described benefits and a superior implementation of several services that each exist in the prior network art using existing equipment and modest software modifications. These include Automatic Interrupt Service (AIS) and Local Number Portability (LNP) in telephone networks. The forgoing discussion has described or mentioned several different embodiments of a method and system of network addressing and translation in a telecommunication network. However, a variety of other embodiments exist, or can be created, that still use the principles discussed above, and these embodiments are intended to be encompassed within the scope of this invention. Moreover, the teachings with respect to symbolic addresses and FP codes are applicable to other types of networks.

Embodiments in Transportation Networks

Particular embodiments of the present invention are applicable to transportation networks that use symbolic addresses for control and selection of the origin and/or destination point. Such networks typically have a plurality of transportation links in place between transit points in the network. This, a plurality of transportation links are available for selection of an ongoing path to the destination. The selection of a specific outgoing link may be effected by manual, semi-automatic, or automatic techniques. However, in all of these cases, the choice or selection of a particular outgoing link is responsive to the symbolic address, as well as other types of information.

In many cases, the originator knows a symbolic name that partially identifies the destination because it is affiliated with a particular organization, firm or person. Unfortunately, that one symbolic name is often related to a plurality of distinct geographic destinations. The nature of the particular geographical destination for a particular shipment, however, is often related to one or more functional properties of the destination, or in some cases one or more functional properties of the originator or of the item being shipped.

In particular embodiments, an originator may address a message or a parcel to the "XYZ Corporation" without using a street address, city, or zip code, or to a certain street address and city without naming an individual or department at that destination to receive the item. An FP code can be used to indicate which department, division, or technical compatibility the originator desires at the destination, and the proper symbolic address for the destination point needed in the network for proper delivery can be produced from appropriate predetermined translation tables.

For example, a repairable item may be sent to the "XYZ Corporation" with the repair department specified by pre-printed indicia on the shipping label. No street or city is needed on this label. Translation tables in the network will select the closest repair location of the XYZ Corporation.

As another example, a shipment or mailing addressed to a certain named organization, or to a specific address, and originating from the accounts receivable department of the shipper, can be automatically delivered to the accounts payable department at the proper geographical destination address as a result of the appropriate FP code(s). This occurs because the accounts receivable department has set an origin FP code, either as a pre-set or at the time of shipment, that causes the translation tables to select the accounts payable department at the destination. This destination FP code may be automatically entered into the network via electronic devices, or by suitable indicia (such as bar code, alphanumeric characters, a distinctive color, or other sensible pattern) printed on the shipment label as a result of this FP code setup.

In certain cases, the network used for shipment origination is restricted from reaching the desired destination for physical, legal, political or other reasons. For example, in the United States, post office box addresses cannot be accessed by non-postal parcel delivery services as a delivery point. In this case, the parcel delivery service must determine an alternate physical destination address, usually by a slow and unreliable process, such as sending a letter to the post office box in question and asking a person there to contact the parcel delivery firm to provide an alternative geographical address. Another example is a situation in which there is an embargo on shipments to a particular destination country that prohibits sending most items there, but permits the shipment of certain specified exceptional items (such as food or medicines) via a particular trans-originating address (such as a bonded forwarding agent). This trans-originating address is typically not known to the originator, and the originator must expend significant time and effort to determine it. In some cases, due to a temporary emergency, shipments to a particular area are embargoed temporarily until shipping service can be restored, and must be stored at a distinct location until shipments can be resumed. In yet another case, the material to be shipped is hazardous for the transportation network to handle and therefore prohibited, and a trans-originating address must be used to cause a different transportation network to carry the item from the origin to the destination. In the latter case, a distinct transportation network is used, beginning with a "pick up" by a different physical vehicle, for example. In this case, the origin is the trans-originating location.

A data communications network, such as a LAN, a WAN, the Internet, or any other type of public or private data communications network, may be used to provide and support such translation tables and processes for other networks, such as mail or parcel delivery.

Applicable transportation networks that get items from specified origin points and then transport them to specified destination points often act over short distances, acting either as an independent process or sometimes as a preliminary or final part of the overall transportation process that, as a whole, acts over larger distances. Examples of this are a parcel pick up from the origin point to the physical entry point to a long distance transportation network, or a parts picking operation that fulfills an order consisting of a plurality of items that must be taken each from its own storage location and placed in a shipping container. An independent process is exemplified by an automatic or semi-automatic parts picking, assembly and/or insertion process in which piece parts are picked from storage and then each one is assembled automatically or semi-automatically to make an automobile, a printed wiring board "stuffed" with electronic components or any other types of device. In these examples, the correct spatial orientation of the piece part is significant as well as its gross position in space. A bolt cannot be inserted into a threaded opening if the mechanism attempts to insert the bolt head first. An electronic component must have its pins or wire leads facing the printed wiring board, and it must be accurately oriented so these pins or wires will enter the intended holes.

Passenger and freight transportation networks, such as airlines, bus lines, rail and water vessel lines also operate in a similar manner, and internal networks such as luggage handling networks of conveyor belts in airports, item picking operations for packing an order in a warehouse, or pneumatic tube conveyors used in offices are further examples of a transportation network that use symbolic addressing.

As discussed, the present invention is applicable to a variety of transportation networks, including a parcel delivery network, a package delivery network, a passenger moving network, a luggage handling network, a fluid pipeline network, a parts retrieval network, a parts handling network, a parts assembly network and a parts insertion network. In general, however, the present invention is applicable to any type of transportation network that can move an object— item or substance—from one location to another.

In some cases, the symbolic addressing information is associated with the item in transportation networks by a label or other media such as bar coding, magnetic stripe coding, attached/embedded radio transponder, or other devices that can be read or sensed by human workers or appropriate equipment directly from the item itself. In other cases, a logically separate or even physically separate data communication network is established to convey the symbolic addressing information associated with each item, for control of the sorting and switching.

Examples of destination symbolic addresses in transportation networks include the following: 1) A street address, such as "123 Main St., City, State, Zip (postal) Code", is used in the United States, and a similar address format is used in other nations, for delivery of mail and parcels. 2) An aisle number, stack number, and shelf number (and in some cases a bin number or further identification as well) is used to indicate where to store or retrieve merchandise in a warehouse or piece parts in an assembly plant or factory. 3) A multi-digit number is used in a pipeline network to indicate the destination for fluids such as gas, oil, milk, paint, or other fluid substances transported via pipes. 4) A string of character symbols is used to designate a destination for freight and passengers. The symbols may comprise both letters and/or numbers. One example is the airport code (such as DFW representing the Dallas-Fort-Worth international airport) used on air transport luggage and air tickets. 5) A set of spatial co-ordinate numbers and one or more angular orientation angle values are used together to indicate the position and orientation of a piece part in an assembly of pieces. In some cases, such as inserting a bolt to fasten several parts together in a vehicle assembly system, three spatial co-ordinate values and two angular orientation values would be used. There are also many cases in which a two dimensional space coordinate position and a single angle of orientation are adequate. Insertion of electronic components on a printed wiring board is a case of the latter type.

Typically transportation networks ultimately designate a geographical location via symbols that are known to and in fact generated by the human originator or some agent for the human originator. This is often awkward or slow to use, because the originator does not always know the necessary destination SA, or even geographical DP, before sending a shipment, and must expend significant time and effort to determine one or both of them. Moreover, even though the originator may know the street address of the business office headquarters of the "XYZ Corporation", the same sender may not always know the distinct street address of the repair department or other departments that are appropriate for a particular shipment. In some cases, the originator lacks timely destination address information, and the particular group or division has relocated to a different distinct geographical location and, hence, destination SA that is not known to the originator at the time of shipment. In other cases, the originator knows only a partial address such as XYZ Corporation.

A particular embodiment applied to a parcel delivery network is explained below. The same principles may also be applied to a passenger transportation system, a fluid pipeline network, a luggage handling system, a piece-part storage or retrieval system or network, a piece-part assembly, handling, or insertion system or network, or any other type of transportation system or network that moves an item from one location to another.

Figure 3:
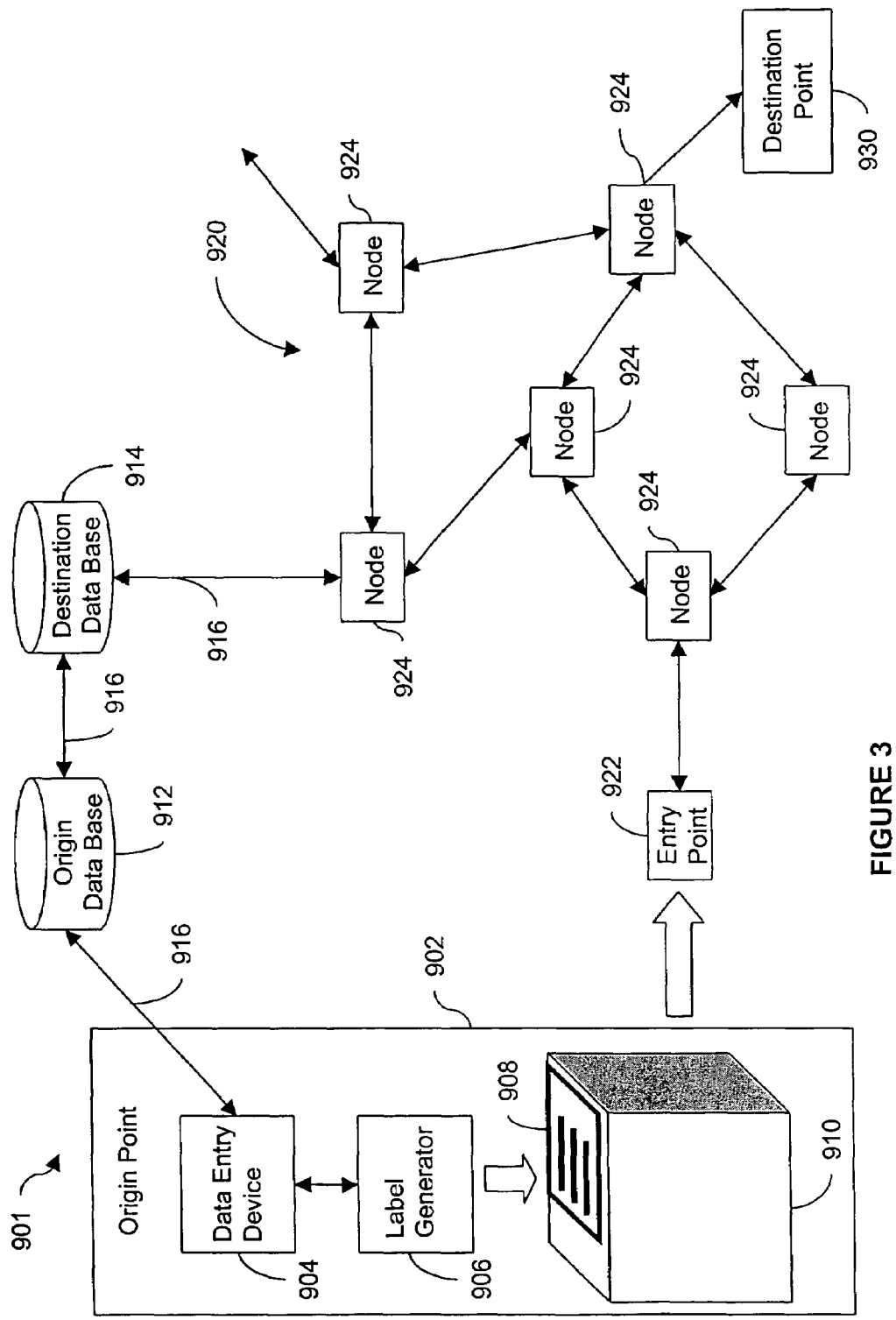
FIG. 3 illustrates an embodiment of the present invention in a transportation network.

FIG. 3 illustrates one embodiment of a transportation system 901 in accordance with the present invention. In general, transportation system 901 includes an origin point 902, a destination data base 914, a transportation network 920, and a destination point 930. Transportation system 901 moves an item 910 through transportation network 920, from origin point 902 to destination point 930, by using destination data base 914.

In more detail, origin point 902 includes a data entry device 904, which can obtain user input indicating a destination address and associated FP codes(s) and, in certain embodiments, can send the destination address and FP codes(s) to destination data base 914 and receive a network destination address from destination data base 914. Coupled to data entry device 904 is a label generator 906, which can produce a label 908 based on data passed from data entry device 904. Label 908 can then be affixed to or otherwise associated with item 910, which is to be transported to destination point 930.

Also coupled to data entry device 904 is an origin data base 912. Origin data base 912 contains a variety of possible destination addresses and FP codes that an originator can select between. Origin data base 912, in turn, is coupled to destination data base 914, which contains an identification address and associated FP code(s) for numerous network destination addresses. Destination data base 914 determines the network destination address based on the destination address and FP code(s) sent from data entry device 904. Links 916 couple data entry device 904 to origin database 912 and destination database 914, and may be serial or parallel analog links, digital links, or any other type of link that can communicate information by electric or electromagnetic signals. Although FIG. 3 shows a particular coupling between data entry device 904, origin data base 912, and destination data base 914, a variety of other configurations exist that are readily implementable.

Transportation network 920 includes an entry point 922, at which item 910, with label 908 affixed or associated, can enter transportation network 920. Coupled to entry point 922 are nodes 924. Item 910 moves through transportation network 920 by moving between nodes 924, sometimes called transit points. Nodes 924 are interconnected with each other by ground, air, and/or water links, and include any type of device for moving item 910 from one point to another. At least one of nodes 924 is coupled to destination data base 914.

The operation of transportation system 901 includes several operations. Prior to beginning to transport item 910, the relevant data in origin data base 912 and destination data base 914 is prepared. For each identification address in destination data base 914, a record is established. This record has sub-sections, in general, and each sub-section comprises FP code(s) a network destination address and associated, which are meaningful to transportation network 920. Each sub-record represents a specific destination point. Each specific destination point is typically represented by a network destination address. Each specific destination point is distinguishable from others by a specific set of FP codes that are relevant to that particular specific destination and by its identification address.

The logical organization of a data record for an identification address can be understood by reference to Table 14. Table 14 shows two hypothetical data records, one for the "ABC Company" and the other for the "XYZ Corporation". The record for ABC has two sub-sections, and the record for XYZ has three sub-sections. The identification addresses "ABC company" and "XYZ Corporation" are repeated in each sub-section of Table 14 for convenience of the reader of this description. In an actual data table, however, these identification addresses would not necessarily be repeated as shown here. The row number is not a part of an actual record in the data base, but is here only for convenience in referring to each row in the next when discussing Table 14.

TABLE 14

Example Data Records in Destination Database 914

| Row | Identification Address | FP code(s) | Network Destination Address |
|---|---|---|---|
| 1 | ABC Company | Headquarters, factory, spare parts | c) 12345 Main St., Suite 217, River City, STATE, postal code |
| 2 | ABC Company | Repair location | c) 265wm Shady St., Littleville, SECONDSTATE, postal code |
| 3 | XYZ Corp. | Headquarters | c) 12345 Main St., Suite 415, River City, STATE, postal code |
| 4 | XYZ Corp. | Shareholder Relations, Accounting Dept. | c) 456ht Side St., Smalltown, OTHERSTATE, postal code |
| 5 | XYZ Corp. | Hazardous materials location | LL) 106° 14' 19" W longitude, 33° 9' 14" N latitude |

Although the entries in this table are shown here using alphanumeric characters, the internal representation in the translation data base is typically via binary symbols. These binary symbols may be grouped into octets or bytes that each represent an alphanumeric character symbol. However, a quite useful method for representing various FP codes is to use a binary code for each code, and to group or organize them in such a way that more than one can be concatenated and the boundaries between different codes can be readily distinguished. Thus, the codes can each be represented by a fixed size group of binary bits to distinguish the boundaries, and each distinct binary numeric value is assigned to represent a particular distinct code value. Thus, using fixed size groups consisting of 7 bits, the value 0000001 could represent "headquarters," while the value 0000010 could represent "factory," and so on. Alternatively, the bits could be grouped in different size groups by using the well-known Huffman code. Huffman coding intrinsically distinguishes the boundaries of each code due to the binary structure of each code value. In one type of Huffman coding, the value 0 could represent "headquarters," while the value 10 could represent "factory," the value 110 could represent "repair location," and so on. Aside from the inherent recognition of the boundaries between adjacent code elements, the shorter Huffman codes may be advantageously assigned to more frequently occurring FP meanings, and thus the total storage of FP data is minimized. In this example, rows 1 and 4 each contain two FP codes, while rows 2, 3 and 5 each contain only one FP code. This will lead to a different total quantity of binary bits used for the FP codes in each row. Data structures to handle sub-sections that have different quantities of binary data bits in each row in corresponding columns are well known to those skilled in the computer art, via use of boundary pointers, length prefixes, and other methods.

Although the internal storage of FP codes may be implemented via binary values, these codes may be represented by the alphabetic names shown in Table 14 for all human interface displays, using devices and methods well known to those skilled in the computer art.

The network destination address entries in Table 14 are represented in alphanumeric characters for the convenience of the reader of this document. However, the internal storage form may be different than a simple character code representation of each character in the table example shown here. The initial symbols such as c) and LL) indicate the internal form. These symbols would actually be represented by different binary values of a data sub-field of this record. The symbol c) represents a code value that implies that the network destination address is a character-coded string (such as ASCII alphanumeric character code) that can be directly displayed or printed. The symbol LL) represents a code value that implies that the network destination address is a combination of latitude and longitude. The implementers of this invention may chose to actually represent these two quantities, latitude and longitude, in character-coded decimal numbers for the degree, minute and second of arc, or alternatively may chose to represent each quantity, latitude and longitude, as a fraction of a full circle in binary form.

The network destination address entries in rows 2 and 4 are examples that use alphabetic characters in a normally numeric portion of the destination address. These destination addresses may be assigned to various buildings or building entrances that have no "official" distinct street address assigned by tradition or by local government. So long as the transportation network personnel and equipment use a consistent relationship between symbolic address and a physical delivery location, there is no negative effect on traditional addresses known to the public.

The network destination address in row 5 uses the latitude-longitude form because it is geographically in an uninhabited mountainous desert area (in the state of New Mexico) that has no roads or streets, and which incidentally may be only approachable via helicopter.

The form and organization of data records used in a piece part handling and assembly process are similar to that above, but in most cases the geographical locations described in the network destination address data field will be coordinate values in a two-dimensional or three-dimensional coordinate system, and where appropriate the spatial orientation data for the piece part will be given as well. This is not shown here in detail because the methods used to indicate the position of piece parts for part picking and handling operations are already well known to those skilled in these arts.

When item 910 is to be routed, data entry device 904 receives originator input indicating a destination address and associated FP code(s). The originator may input these herself or with the assistance of origin data base 912. Then, data entry device 904 sends the destination address and associated FP code(s) to destination data base 914. Destination data base 914 sorts through its records to determine a match based on the destination address and the associated FP code(s). If a match is found, destination data base 914 returns the network destination address in the matching sub-record to data entry device 904, which then sends the data to label generator 906. Label generator 906 then generates label 908. After this, label 908 can be attached to or associated with item 910, by manual and/or automatic operations, and item 910 can enter transportation network 920 at entry point 922. From entry point 922, item 910 is routed between nodes 924. When item 910 reaches one of nodes 924 that services destination point 930, it can be delivered. Note, in other embodiments possessing similar operations, destination data base 914 need not be coupled to one of nodes 924.

An alternative manner in which transportation system 901 can operate begins with data entry device 904 obtaining originator input indicating a first destination address and associated FP codes(s). The originator may again input these herself or with the assistance of origin data base 912, which could provide the user a variety of destination addresses and/or FP code(s) from which to choose. In this scenario, however, data entry device 904 sends the destination address and associated FP code(s) to label generator 906, which generates label 908 with the first destination address and associated FP code(s). After this, label 908 is again attached to item 910, and item 910 can enter transportation network 920 at entry point 922. From entry point 922, item 910 is again routed between nodes 924. However, at one of nodes 924, destination data base 914 is queried with the destination address and associated FP code(s) to determine the network destination address. Destination data base 914 sorts through its records to determine a match based on the destination address and associated FP code(s). Destination data base 914 then returns the network destination address that is in the matching sub-record to the querying one of nodes 924, which can then modify label 908 to include the network destination address. Transportation network 920 then routes item 910 based on the network destination address. When item 910 reaches one of nodes 924 that services destination point 930, it can be delivered.

Note, in particular embodiments, destination data base 914 can be queried from any location in transportation network 920, such as origin point 902, entry point 922, a vehicle transporting item 910 over a link, a human in the vicinity of item 910, or any other location through which item 910 passes. Each of these locations would also be considered a network point. In general, then, a "network point" is any location in a transportation system, such as transportation system 901.

In a modification of this operation, an originator may simply fill out label 908, indicating a destination address and associated FP codes(s), and attach label 908 to item 910. Item 910 can again enter transportation network 920 at entry point 922 and be routed between nodes 924. At one of nodes 924, destination data base 914 is again queried with the destination address and associated FP code(s) to determine the network destination address and returns the network destination address that is in the matching sub-record to the querying one of nodes 924. Transportation network 920 then routes item 910 based on the network destination address.

A variety of other options and manners for sending the destination address and associated FP code(s) to destination data base 914 exist. It is intended that the scope of the present invention encompass such options and manners.

Data entry device 904 may be a dumb terminal—one that receives commands from origin data base 912 or destination data base 914, a stand-alone computer, or any other type of device that can obtain data from an originator, query a data base, receive output from the data base, and/or supply the data to label generator 906. Label generator 906 may be a laser printer, an ink jet printer, a bar code generator, or any other type of device that can produce a label with routing information.

The destination address, which is obtained by data entry device 904 in certain embodiments, may be a complete postal address, a partial postal address, a partial network destination address, a complete network destination address or any other information that could be used to route an item in a transportation network. Similarly, the identification address may be a complete postal address, including a post office box address, a partial postal address, a partial network destination address, a complete network destination address or any other information that could be used to at least partially identify a destination point in a transportation system. The network destination address, which destination data base 914 contains, may be a complete postal address, a partial postal address, or any other information that could be used to at least partially identify a destination in a transportation point system. In particular embodiments, the network destination addresses are not postal addresses, but are pseudo-addresses, which still have meaning within transportation network 920. Examples of pseudo-addresses include a postal address modified by an entry location, a geographic position, such as a latitude and longitude, or a specific person. In general then, pseudo-addresses can be used to convey almost any type of location information. Pseudo-addresses may or may not have significance outside of transportation network 920.

Each of origin data base 912 and destination data base 914 may be a personal computer, a workstation, a mainframe computer or any other type of device that has a processor and a memory. The processor may be a complex instruction set computer (CISC), a reduced instruction set computer (RISC), or any other type of device for electronically manipulating electronic data. The memory may be random access memory (RAM), read-only memory (ROM), compact disk ROM (CD-ROM), registers, or any other type of volatile or non-volatile magnetic or optical memory device. Origin data base 912 and destination data base 914 may organize their respective data in relational, flat, hierarchal, and/or network formats.

In particular embodiments, origin data base 912 may or may not be coupled to destination data base 914. If origin data base 912 is coupled to destination data base 914, destination data base 914 may or may not be coupled to transportation network 920. If, however, origin data base 912 is not coupled to destination data base 914, destination data base 914 should be coupled to transportation network 920. In certain embodiments, origin data base 912 may be co-located with origin point 902, or even a part of data entry device 904. In other embodiments, transportation system 901 may not even include origin data base 912. In these embodiments, data entry device 904 could communicate directly with destination data base 914, in which case destination data base would not have to be coupled to transportation network 920, or could be uncoupled from destination data base 914, in which case destination data base 914 would be coupled to transportation network 920. In certain embodiments, destination data base 914 could be co-located with origin point 902, or even a part of data entry device 904. In other embodiments, origin data base 912 and destination data base 914 could be the same data base. In some of these embodiments, the data base could be co-located with origin point 902, or even a part of data entry device 904. In general then, the invention encompasses any arrangement and configuration of data entry device 904, origin data base 912, and destination data base 914.

Prior to ending an item through a transportation network, a destination address entry is made for the item. In the embodiment described above, the originator may either type in an address from a keyboard, or may select an address from a list or menu, by using keyboard strokes, mouse click, or other technique, at data entry device 904.

The invention also uses FP code(s) in addition to the destination address. Some or all of these FP codes may be pre-stored defaults for this origin point by data entry device 904, or some or all may be entered by the originator or by equipment installed for this purpose, such as a weighing scale. Note, while the storage and manipulation of the data used to produce a label may be done at data entry device 904, the storage and manipulation may also be performed at entry point 922, destination data base 914, or nodes 924. Accordingly, a variety of choices are open to the implementer of the present invention.

The address is represented in two forms at different stages of the process. First, the address is represented as a combination of the destination address entered at origin point 902, together with one or more FP codes. At a later stage in the process, destination data base 914 translates the combination of the destination address and associated FP code(s) (the translation input) into an appropriate symbolic representation of the true physical destination address, namely the network destination address (the translation output). Labels used in the process may bear representations of either one or both of these forms at various stages of the transportation process. This translation may occur at origin point 902, entry point 922, destination data base 914, or one of nodes 924. Depending upon its physical form, the relevant label may be modified or replaced as required.

The method of labeling may be different in different types of networks. In the example, the originator enters a destination address, which will be used, together with appropriate FP codes, to derive a specific network destination address for item 910. In particular embodiments, the originator need not manually enter into the labeling process each and every FP code related to the shipment. Some of these FP codes can be pre-stored default values relevant to the origin. At the time the label is generated, some FP codes may be entered by the originator for use in a particular shipment of a particular item. Other functional properties need not be manually entered by the originator, but may be measured or determined by automatic equipment and then entered into the "label" without conscious action taken by the human originator. One example is the weight of the item, which may be measured by a weight scale, and then the weight value is automatically entered as a functional property. Other functional properties may be determined by automatic equipment. Identification of an item to be shipped can be determined by equipment such as a bar code scanner scanning a tag or paper label on the item to be shipped, an automatic visual scene or object optical recognition system, such as that described by Khotanzad and Liou in "Recognition and Pose Estimation of Unoccluded Three-Dimensional Objects from a Two-Dimensional Perspective by Banks of Neural Networks," *IEEE Transactions on Neural Networks*, Vol. 7, No. 4, pgs. 897-906, July 1996, using visible light, infra red or radio wave radiation or the like, or by using pre-stored functional property codes that are retrieved from memory in response to the entry of the name, type number, model number, or other identification associated with the item to be shipped. These various methods contemplated for generating FP codes are not explicitly shown in FIG. 3.

Among the functional property codes that are entered at the time of a particular shipment, some may act in addition to the default pre-stored origin FP code(s), while others may supplant the pre-stored default origin FP code(s). However, entry of shipment-specific FP codes typically does not cause a modification of the default origin FP codes. Following the composition of a label for that particular shipped item, the usual procedure is that only the default FP codes are used as default values for the next successive shipped item, and the shipment-specific functional property codes are not saved. However, the system provides the user the option of saving and reusing designated shipment-specific FP codes for several successive shipment items. In that way, the user can group together consecutively a quantity of items that have the same or similar shipment-specific FP code(s), and thus reduce the labor of entering the shipment-specific FP code(s) for each such shipment item.

As an example, the originator may enter the destination address and any desired FP code(s) in this way. The first destination address for a shipment may be "XYZ Corporation." The FP codes may be "repair" and "toaster." The first destination address may be entered by typing the 15 alphabetic characters (including the space) which make up the name "XYZ Corporation." The two codes "repair" and "toaster" may likewise be typed as two alphabetic character strings, or in some origin locations the code for "repair" is a default for that shipping location, and only the code "toaster" need be entered as a shipment specific entry. These two codes may also be entered by numeric entries, where for example the numeric code 23 represents "repair" and the numeric code 92 represents "toaster." However, there are numerous alternative methods for entry of this information that reduce the labor and time consumed, and increase the accuracy which will be obvious to those skilled in the art.

Techniques for entering the above data may include, but are not limited to, typing the code via a keyboard, making a selection from a menu of available codes and categories selected by a scan via a wand that recognizes symbols or bar codes, making a selection by checking a square or other type of indicia on a surface, and then optically scanning that surface, use of a mouse or a touch-sensitive screen in conjunction with a graphic user interface (GUI), moving a part of one's body to a location that can be sensed by photo cell, capacitive, radio or other sensing device, or by directing the view point of the human eye onto a particular visible index when such position of the eye can be sensed by an appropriate apparatus. The menu selection may also be made by selecting a physical label or label portion from one of a plurality of different boxes or supplies of prepared labels such that the selected label bears the appropriate FP code(s) in a form sensible to appropriate sensing equipment via color, optically scannable symbols on the selected label, or the like. The originator may speak the needed input information into a microphone that is connected to a speech recognition system. Furthermore, the selection from the menu may be made by traditional low-technology methods, such as physically placing the item to be shipped into a particular bin or chute, chosen from among a plurality of bins or chutes, where each such bin or chute is associated with a particular choice of FP code(s).

Note that all of the above methods may be applied interactively and/or sequentially, so that a primary choice may be made by one such action, thus specifying a portion, but not all, of the appropriate FP code(s) for the shipped item, and then leaving a further FP code choice to be selected via a second or later action. For example, the first action may involve only one choice from among two menu selections. Thus, the shipper may separate fragile items from non-fragile items, but leave unspecified certain other functional specifications. The items that are thus symbolically labeled with the "fragile" FP code may be many different kinds of items that each require further actions to assign further FP codes, such as "repair" or "medium weight range." These further actions may be performed at a different physical location by a different person or by different equipment. Those items that were not symbolically labeled "fragile" via the first action would be subject to other actions to assign further appropriate FP codes as well, and these actions likewise may be performed at a still different physical location by yet a different person or equipment, distinct from those involved in the first action and the other described secondary action.

The resulting total label input information may be embodied as a conventional paper label bearing symbols visible to the human eye. These symbols may be alphanumeric characters readable by human beings. A visible label may also bear marks or symbols not directly interpretable by humans, such as bar codes or color codes. FIG. 3 shows a label generator 906 that generates a label 908 on a material that can be affixed to item 910. It will be obvious to one skilled in the art that the location at which the label is generated need not be coincident with data entry device 904 nor need it be coincident with the initial location of item 910.

In some circumstances, a label may not be physically attached to the relevant item that is shipped. For example, a shipment consisting of objects that are too large or too amorphous to be conveniently labeled may be carried separately by a driver or courier, while the actual-item may be carried in the trailer or tank of a tractor-trailer or tank truck, in a freight car of a railroad train, or in the cargo hold or storage tanks of a seagoing vessel. In a passenger transportation network, the passenger may carry the label on a piece of paper such as a ticket, and in some cases one person may carry the label(s) for other passengers, such as a parent accompanying a traveling child. As a further example of the appropriate generality of scope of the term "label," an example of a fluid pipeline network is included, although that is not the illustrative example given here. When a fluid pipeline network is used to transport one fluid (such as oil) and later a different fluid (such as gas), the two fluids are separated by a movable object called a "pipeline pig." This "pig" is made so that it can slide along inside the pipe while forming a substantially fluid-tight seal between the two fluids. A pipeline pig may be designed to include a radio communicator that continually communicates radio identification signals that can be received by appropriate equipment outside the pipes. In a similar manner, a "smart card" incorporating both a central processor and memory can be used to carry label identification for a wide variety of items. The smart card may be interrogated by radio signals, or electrical current waveforms may be applied to electric contact terminals. This combination of processor and memory used in the particular "smart card" embodiment of the label also allows the smart card to support information exchanges that provide authentication and encryption of the identification information in a manner which prevents falsification and interception of the label information. Such so-called "challenge response" transactions for authentication are well known to those skilled in the art.

In short, any technique of presenting the label information for a specific item of shipment that is sensible to the appropriate parts of the network qualifies as a label.

Figure 4:
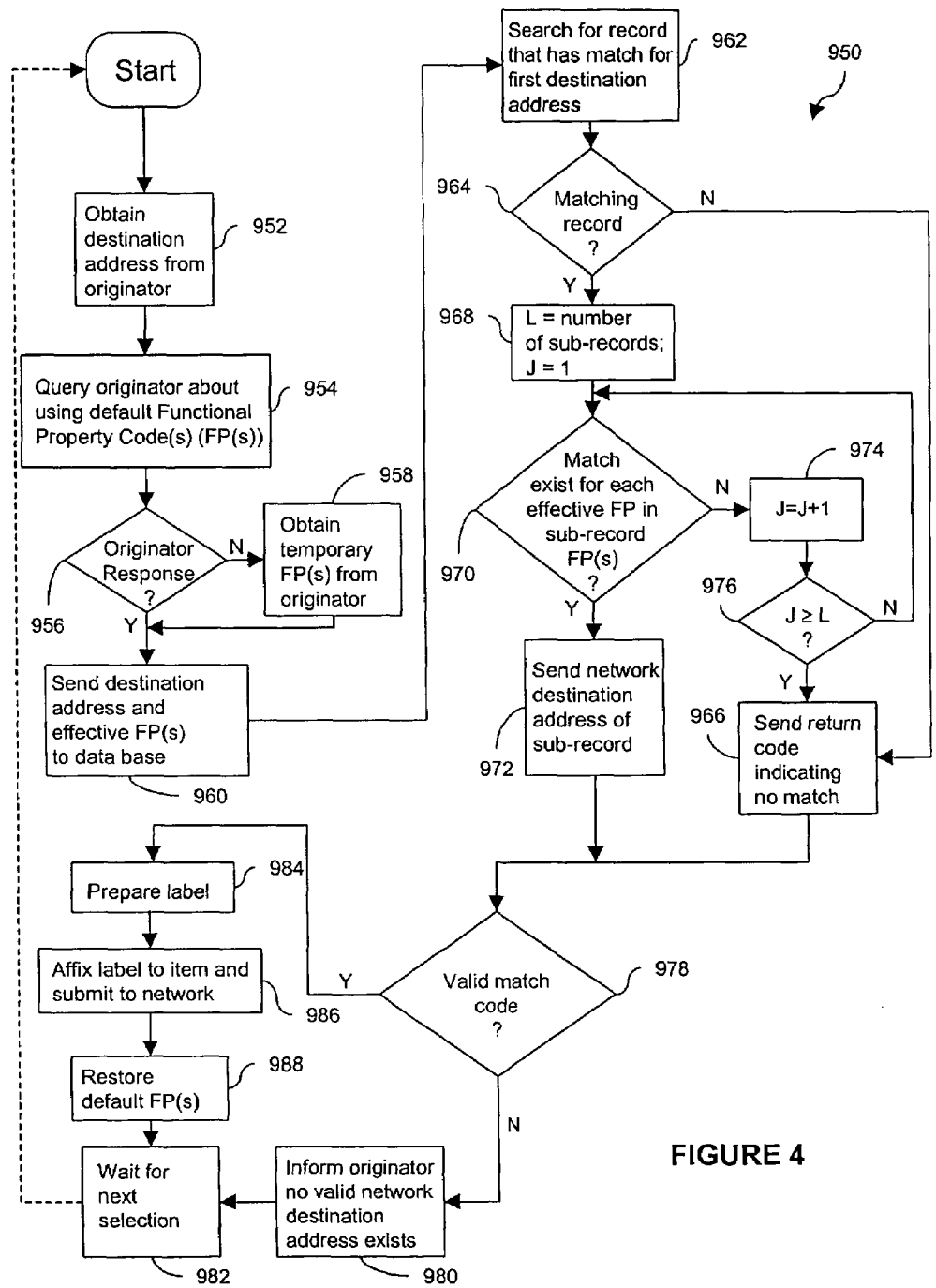
FIG. 4 is a flowchart illustrating one embodiment of one method for determining a network destination address in a transportation network.

FIG. 4 is a flowchart 950 illustrating one embodiment of a method to determine the network destination address. Note, however, that before the actions illustrated in FIG. 4 take place, the data base that describes the origin point and facilities, such as origin data base 912, already possess the appropriate information. This information includes the default FP code(s) for the origin point. Likewise, the destination data base, such as destination data base 914, possesses a record containing appropriate of valid identification addresses before the actions indicated in FIG. 4 take place. Each valid record contains at least one sub-record, a sub-record including the destination FP code(s) appropriate to one network destination address, and a representation of that network destination address. There are L sub-records in a record. The index J is used to count sub-records.

The particular embodiment that flowchart 950 illustrates is one in which the destination address is to be embodied on a label, such as label 908, that can be affixed to the item itself. The origin point is equipped with a display and a keyboard to permit the originator to view the display and enter alphanumeric information via the keyboard.

The process of obtaining a network destination address begins with the data entry device, such as data entry device 904, obtaining a destination address from an originator, typically a human, at step 952. The data entry device also queries the originator as to whether she wishes to use the default FP code(s) at step 954. If a response is received that the originator does not wish to use the default FP code(s) at step 956, a set of temporary FP codes is obtained at step 958. After obtaining the temporary FP codes at step 958, or if a response is received indicating that the originator wishes to use the default FP code(s) at step 956, the data entry device sends the destination address and the effective FP code(s), default or temporary, to the destination data base at step 960.

The destination data base performs a search for a record that has an identification address that matches the destination address at step 962. If the data base determines at step 964 that no record has a match for the destination address, the data base sends a return code indicating no match was found at step 966. The process then returns to the data entry device at step 978. If, however, the destination data base determines at step 964 that a record does have a match for the destination address, the data base performs a search of the sub-records of the record.

At step 968, the destination data base sets two variables, one for the total number of sub-records for the record and one for a counter. At step 970, the destination database determines whether each effective FP code has a match in the FP code(s) of the current sub-record. If each effective FP code does have a match, the destination data base sends the network destination address of the current sub-record to the data entry device at step 972. If, however, the current sub-record does not have a match for each effective FP code, the destination data base increments the counter for the sub-records at step 974 and determines whether all of the sub-records have been searched at step 976. If all of the sub-records have not been examined, the next sub-record is then examined at step 970. However, if all of the sub-records have been examined at step 976, step 966 is performed, as discussed previously.

At step 978, the data entry device determines whether the return code indicates a match was not found. If the return code does indicate no match was found, the origin data base informs the originator that no valid network destination address exists for the particular combination of destination address and effective FP code(s) at step 980. The origin data base waits for another selection from the originator at step 982. However, if the return code indicates a match was found, the data entry device prepares a label in conjunction with the label generator, with the network destination address at step 984. Then, the label is affixed to the parcel, and the parcel is submitted to the transportation network at step 986. Note, steps 984 and 986 can be a totally automated process, a totally human process, or a combination of automation and human processes. The data entry device restores the default FP code(s) at step 988 and waits for the next selection from the originator at step 982.

There are many implementation options that may be used in other embodiments. Thus, flowchart 950 only illustrates one combination of options that can be chosen in order that a simple and clear example may be give to the reader. Many other combinations are feasible and useful for different applications and configurations of transportation system 901.

For example, flowchart 950 only illustrates the case in which those FP codes that are desired or descriptive for the origin and destination, respectively, are used. Thus, this example does not illustrate the cases of negative or forbidden FP code(s). Likewise, this example does not illustrate the case of mandatory FP code(s). However, the modified sequence of steps for these last two cases will be apparent to one normally skilled in the art. Briefly, for the case of forbidden FP codes, when a negative or forbidden FP code is present in one of the two lists (that is, the origin FP code list or the destination FP code list of a particular sub-record), and the corresponding FP code is in the other list, that particular sub-record must be skipped over, even if other FP codes are identical between the two. For the case of mandatory FP codes, when one of the two lists (that is, the origin FP code list or the destination FP code list of a particular sub-record) contains a mandatory FP code, that particular sub-record must be skipped over if the opposite list does not contain the same FP code (in either normal or mandatory form), even if other FP codes are identical between the two. These last two cases are not illustrated in FIG. 4.

As another example, in FIG. 4, a particular option for the method of deriving an effective set of origin FP code(s) is implicit at step 958. The option, however, is not apparent from FIG. 4. One such option is to temporarily suspend each default FP code and temporarily replace them with the temporary FP code(s) obtained from the originator. Another option is to combine the default FP code(s) with the temporary FP code(s) obtained from the originator. Yet another option is to allow the originator to enter a command that will select one of the two previous options at the will of the originator for each object to be shipped. Still another option is to assign each FP code to a category, and to designate in advance that certain categories of FP code(s) are "compatible," and thus members of this/these "compatible" categories are to be retained whether they occur in the default or temporary list, while others in other categories that are not declared in advance to be compatible with individual default FP code(s) are discarded. A variation on the method described in the previous sentence is that default FP codes that are not compatible with temporary FP codes are temporarily discarded when they are not "compatible" with temporary FP codes. Many different criteria may be used unambiguously, without departing from the concepts and spirit of the invention.

In the example of FIG. 4, another particular implementation option is implicit in the sequence of steps illustrated in that only the particular case for which all the FP codes contained in the origin FP code list are also contained in the particular sub-record destination list is shown. In that case, a particular sub-record may be selected in which there is/are one or more additional FP codes contained in the particular selected sub-record destination FP list that do not match any FP code in the origin FP code list. Although it is not illustrated in FIG. 4, it will be apparent to one normally skilled in the art that other criteria for selecting a particular sub-record may be used. For example, one may select a sub-record because all the FP codes in that particular sub-record FP list are contained in the origin FP code list. In this case, a particular sub-record may be selected in a case where there is/are one or more additional FP code(s) contained in the origin FP code list that do not match any FP codes contained in the particular selected sub-record destination FP code list.

As a further example, FIG. 4 illustrates the scenario where the first sub-record meeting the criteria stated in the previous discussed examples will prevail even if other sub-records exist at higher values of the index J that also meet the same criteria. FIG. 4 does not illustrate several alternative options, the implementation of which will be apparent to one normally skilled in the programming art. For example, a sequence of steps may be implemented in which the sub-record that has the largest number of matching FP codes from among the two lists (the origin FP code list and the destination FP code list for that particular sub-record) prevails. As another example of an option, the destination data base may select the first destination sub-record that meets one of the criteria discussed here (or in a general situation, any criterion), when another sub-record also meets the same criterion but is later in the list. Furthermore, another option that may be implemented is to select the last destination sub-record that meets a certain criterion, even though other sub-records earlier in the list also meet the same criterion equally well. Various other options exist and will be readily apparent to one skilled in the art.

Many other options, combinations, and configurations are feasible and useful for different applications and will be readily apparent and implementable to one skilled in the art.

In many transportation networks, the network must know the initial location of the item. Parcel delivery services come to this point to pick up the parcel. Piece part and order picking systems must obtain piece parts from the correct storage bin. All of the same capabilities and operations described here regarding the network destination address may, in certain implementations, be used to describe the initial location as well, including the use of a destination address, FP codes, translation between different symbolic address forms, etc. Furthermore, information of the same type, but descriptive of the originator rather than the destination, may be included in the label, or in a separate "return address" label. This information is for convenience in either returning the item (if that should prove to be necessary), to track the current status of the item as it traverses the transportation network, or to acknowledge the delivery of the item to its intended destination. Return of the item, tracking information or acknowledgment may each be directed to the originator. Return of the item, tracking information or acknowledgment may also be directed to a "virtual" return address location, distinct from the true physical origin point, if so specified by the originator.

In particular embodiments, the information regarding the originator could also be used to route the item to the destination point. For example, assume the destination address and associated FP code(s) that are supposed to identify a destination point do not do so uniquely or unambiguously, or assume the destination address and associated FP code(s) identify multiple destination points, creating an ambiguity. By using the FP code(s) of the originator, the destination data base may be able to determine a compatible destination point. For example, suppose that the FP code of the origin point indicates that the package is from the accounts payable department. Then, the destination data base may associate the accounts payable department of the originator with the accounts receivable department of the recipient, which may allow the item to be routed to a destination point or to resolve an ambiguity of destination points. As another example, the destination point that is closest to the origination point may be chosen where other factors do not lead to one unique choice. The information regarding the originator may also be useful in a variety of other circumstances.

The particular point at which a translation query is made to change the first set of information to the second set of information may take place at any appropriate point in the transportation network. As discussed previously, the translation is performed by a previously prepared data base that contains a network destination address for each combination of destination address and associated FP code(s), such as destination data base 914. This translation process may occur at the actual point of origin, or at an intermediate point in the network, or at a point nominally described by the destination address together with none of the relevant FP codes, or by the destination address together with one or more of the relevant FP codes, but not necessarily all of the relevant FP codes. The translation process requires that information be transferred to and from the data base, but does not require that the physical item to be shipped actually be present at the data base.

The information contained in the label is one element used to select a path through the network. The information on the label is used to select one of a plurality of outgoing links at those node points in the network that have a plurality of outgoing links. The choice of a particular outgoing link is determined by the desired destination but also by the cost, the travel time, the current state of each link with regard to such factors as congestion, possible damage to the shipped item, and other factors as well. The art of choosing the best links to make up an appropriate path is well known to those skilled in the art. Routing or selection algorithms that utilize a traditional destination code entered in full by the originator, such as a state name or abbreviation, or a postal code (zip code) are also well known. In certain embodiments, however, either the destination address with FP codes in one alternative, or the network destination address in another alternative, may be used to choose the best link(s).

In the described embodiment, destination sorting is based on the network destination address. Transportation networks that also continue to carry items bearing a conventional address (for example, a street address such as 1234 Main St., City, State) as well as items bearing a network destination address must also continue to sort based on conventional addresses as well. This may involve two separate processes, or, in case of a network destination address that has a format that is an extension of the format of historical conventional addresses, such as 123w Main St., an extension of existing sorting methods based on conventional addresses. Human sorting is included, for example, in the case where the human sorter memorizes frequently used destinations.

There are many examples that could be used to indicate how the translation process is used. For example, in one case, the label contains the destination address and the desired FP code(s) for the destination point. At some location, this data is used as input to a destination data base, such as destination data base 914, and an explicit network destination address is produced as output. This is used to modify or replace the label of the shipped item. Subsequent sorting operations at network nodes are responsive to this explicit destination address. In a second case, the label contains the destination address and the FP codes, which hopefully identify the destination point. At each node in the transportation network where a sorting choice is needed, the information on the label is used as input to the destination data base and the network destination address is produced as output. The sorting is responsive to the network destination address. However, in this case no modification is made to the label. In a third case, the information on the label indicates a destination address that the transportation network cannot reach. For example, consider the case in which this particular transportation network cannot deliver to a post office box. When the existing destination address information is used as input to the destination data base at some appropriate point in the system, a completely different network destination address is produced as output. In this particular example, the current embodiment would modify or replace the original label so that the correct network destination address is contained on the label, for use in all subsequent sorting and routing operations. Accordingly, a central data base may be accessed with a destination address and associated FP code(s) to obtain a network destination address at any point and/or at any time in a transportation network.

In a transportation network in which fluid traffic is conveyed via a pipeline or the like, the control of routing is performed by sensors that detect properties of the fluid in the pipe, such as thermal conductivity, sound velocity in the fluid, or other physical or chemical properties. In addition, in some pipelines in the prior art, a solid object called a pipeline "pig" is inserted in the pipe as a separator between different lots of fluid that are sent sequentially along the same pipe, and this pig can be traced by radio, magnetic or other sensors.

Translation tables used in this case may be set up to respond to particular inherent content physical properties of the fluid traffic as well as identification signals provided by the pig. The particular FP codes used in particular industries that use fluid networks would be established by agreements in the industry affected. FP codes for petrochemical industries would include such destination functional properties as different categories of chemical reactor or storage tank functions. Origin FP codes may be designed based on physical or chemical examination of the content of the traffic. For example, the amount of sulfur dioxide in natural gas affects its suitability for use as a general heating fuel (low sulfur) versus limited use only as a chemical feed stock for carbon black (in the case of hydrogen sulfide or sulfur-dioxide-bearing "sour" gas). Appropriate translation tables can specify valve openings and closings to achieve the desired network routing fluid flows and destinations.

From the foregoing description, it will be apparent to those skilled in the art that, in certain embodiments, the present invention can provide faster, easier to use, and more accurate delivery of items via a transportation network. Many modifications and variations of the processes and devices described in this discussion will be readily apparent to one skilled in the art, and such modifications and variations are within the scope of the present invention.

Embodiments in a Data Communications Network

The Internet and associated electronic mail (e-mail) networks are examples of a data communication network. The originator of an e-mail message can type a message, and can also attach data files of various types to the message, and then can consign the message with its attachments to the e-mail network together with a header which comprises the destination SA (for example: john.smith@bigcompany.com), and also the origin SA. Internet users may also establish a network route to a so-called hyper-text transfer protocol (HTTP) server by use of a destination SA of the form http://www.interestingstuff.com.

In an Internet network, items consisting of packets of digital data travel through links to nodes, where they are sorted based on the destination SA, and then sent on their way via an outgoing link selected to optimize the delivery of the item. In a two-way communication, other items or packets of data traffic go from the so-called destination point to the so-called origin point. In many networks such as broadcasting systems, cable television distribution, electric power distribution networks, water and gas distribution pipeline systems, Internet HTTP operations, and the like, most or all of the traffic flows from the so-called destination point to the so-called origin point.

Many networks, including these, also have the structural property that some nodes are used as transit, origin, and destination points. Many networks having a so-called "multi-drop" topology such as local area networks (LANs) for data communication, and the aforementioned gas, water, and electric networks have this topological structure.

In the Internet or an electronic mail network, the originator may use a standardized FP code together with some fragmentary name of the destination person or organization, and the appropriate data bases in the network will translate this into a valid symbolic address. For example, one could address e-mail to "[oldest child of] Ignatz W. Grimsby" where [oldest child of] is one example of an FP code in an alphabetic string form, suitable for a typewriter keyboard entry, and the appropriate predetermined translation tables will translate that into a valid e-mail address such as ed.grimsby@mailplace.com. Similarly, one can attempt to access a world wide web page without knowing in advance the proper web page uniform resource locator (URL) code. One might enter, for example, "[repair department of] Bigcorp" which the appropriate data translation tables would translate into "http:"//www.bigcorp-subsidiary-of-even-bigger-corp.com/administration/manufacturing/repair."

Although several embodiments of the present invention have been discussed, a variety of additions, deletions, substitutions, and/or modifications may be readily suggested to one skilled in the art. It is intended that the following claims encompass such additions, deletions, substitutions, and modifications.

What is claimed is:

1. A method for routing a physical object in a transportation network, comprising:

storing, in a first database, a first address and a first functional property code associated with a first point to be routed, wherein the first address is the first point of routing a physical object, and wherein the first functional property code describes an intended purpose or property for contents of the physical object routed from the first address;

storing, in a second database, a second address and a second functional property code associated with a second point, wherein the second functional property code describes an intended purpose or property for contents of the physical object routed to the second address, wherein the second address describes a second point of routing the physical object, the second point being a requested destination point of the physical object;

storing, in the second database, a third functional property code and a third address associated with the second address, wherein the third functional property code describes an intended purpose or property for contents of the physical object routed to the third address, wherein the third address describes a third point of routing the physical object, the third point is a destination point of the physical object if the second functional property code is not compatible with the first functional property code;

obtaining the first address, the first functional property code, the second address, and the second functional property code associated with the physical object;

determining the third address in the electronic processing environment if the first functional property code is not compatible with the second functional property code, wherein the third address reflects a match between the obtained first functional property code and the stored third functional property code associated with the second address;

sending the third address to the first point if the first functional property code is not compatible with the second functional property code; and routing an object to the third point based on the third address.

2. The method of claim 1, wherein routing the object to the third point based on the third address comprises associating a label containing the third address with the object.

3. The method of claim 1, wherein the second address comprises a partial postal address.

4. The method of claim 1, wherein the second address matches the third address.

5. The method of claim 1, wherein the first address comprises part of the second address.

6. The method of claim 1, wherein the third address comprises a pseudo-address.

7. The method of claim 1, wherein the first point comprises an origin point.

8. The method of claim 1, wherein the second point comprises a destination point.

9. The method of claim 1, wherein the first database and the second database are co-located with the first point.

10. The method of claim 1, wherein the first database and the second database are remote from the first point.

11. The method of claim 1, wherein the first database and the second database comprises a processor and a memory.

12. The method of claim 1, wherein the first address is compatible with the second address if the first address matches the second address.

13. The method of claim 1, wherein the first address is compatible with the second address if the first address matches part of the second address.

14. The method of claim 1, wherein the first functional property code is compatible with the second functional property code if the first functional property codes matches the second functional property code.

15. The method of claim 1, further comprising storing the first functional property code at the first point.

16. The method of claim 15, further comprising modifying the first functional property code before sending the first functional property code to the data base.

17. The method of claim 16, wherein modifying the first functional property code comprises substituting a functional property code other than the first functional property code for the first functional property code.

18. The method of claim 1, further comprising sending a no match code from the data base to the first point if the first address is incompatible with the second address.

19. The method of claim 1, further comprising sending a no match code from the data base to the first point if the first functional property code is incompatible with the second functional property code.

20. The method of claim 1, further comprising storing, at the second database, a fourth functional property code and a fourth address associated with the third point, wherein the third point is also associated with the second address.

21. The method of claim 20, further comprising determining if the first functional property code is compatible with the fourth functional property code if the first functional property code is incompatible with the second functional property code.

22. The method of claim 21, further comprising sending a no match code from the data base to the first point if the first functional property code is incompatible with the second functional property code and the fourth functional property code.

23. The method of claim 20, further comprising:

determining if the first functional property code is compatible with the fourth functional property code if the first address is compatible with the associated second address; and selecting between the third address and the fourth address if the first functional property code is compatible with the third functional property code and the fourth functional property code.

24. The method of claim 23, wherein selecting between the third address and the fourth address comprises selecting the address associated with whichever of the third functional property code and the fourth functional property code matches the first functional property code.

25. The method of claim 1, wherein the data base stores a third functional property code, a second address, and a third address for each of a plurality of second points.

26. The method of claim 25, wherein determining if the first address is compatible with the second address comprises determining if the first address is compatible with any of the second addresses.

27. The method of claim 26, further comprising sending a no match code to the first point if the first address is incompatible with all of the second addresses.

28. The method of claim 1, further comprising storing, at the second database, at least one additional functional property code associated with the second point, such that the second point has multiple associated second functional property codes.

29. The method of claim 28, wherein the first functional property code is compatible with the second functional property code if the first functional property code is compatible with at least one of the second functional property codes.

30. The method of claim 29, further comprising sending a no match code from the data base to the first point if the first functional property code is incompatible with all of the second functional property codes.

31. The method of claim 29, wherein at least one of the second functional property codes comprises a negated functional property code, whereby the first functional property code is not compatible with the second functional property codes if the first functional property code is compatible with the negated second functional property code.

32. The method of claim 29, wherein at least one of the second functional property codes comprises a mandatory functional property code, whereby the first functional property code is not compatible with the second functional property codes if the first functional property code is not compatible with the mandatory second functional property code.

33. The method of claim 28, further comprising obtaining and sending at least one additional functional property code associated with the first address, such that the first address has multiple associated first functional property codes.

34. The method of claim 33, wherein the first functional property code is compatible with the second functional property code if each of the first functional property codes is compatible with at least one of the second functional property codes.

35. The method of claim 1, wherein the transportation network is a parcel delivery network.

36. The method of claim 1, further comprising routing the physical object to an intermediary point between the first point and the third point.

37. The method of claim 36, wherein the intermediary point is operable to modify the physical object.

38. The method of claim 36, wherein the intermediary point is operable to substitute the physical object.

39. The method of claim 36, wherein the intermediary point is operable to associate a label with the physical object, wherein the label contains information facilitating the routing of the physical object to the third point.

40. The method of claim 1, further comprising routing the physical object to an intermediary point between the first point and the second point.

41. The method of claim 1, wherein the first database and the second database are coupled to form one database.

42. The method of claim 1, wherein the first functional property code is one of a plurality of first functional property codes, wherein the second functional property code is one of a plurality of second functional property codes, wherein the third functional property code is one of a plurality of third functional property codes, wherein the first address is one of a plurality of first addresses, wherein the second address is one of a plurality of second addresses, and wherein the third address is one of a plurality of third addresses.

43. A system for routing a physical object in a transportation network, comprising:
a first point operable to obtain and send a first address and a first functional property code associated with the first point to a processor, wherein the first address is the first point of routing a physical object, and wherein the first functional property code describes an intended purpose or property for contents of a physical object routed from the first address;
a processor coupled to the first point, the processor programmed to:
store, in a database, a second address and a second functional property code, and a third address all associated with a second point, wherein the second functional property code describes an intended purpose or property for contents of the physical object routed inherent capability attributable to the second third address, wherein the second address describes a second point of routing the physical object, the second point being a requested destination point of the physical object;
store, in the database, a third functional property code and a third address associated with the second address, wherein the third functional property code describes an intended purpose or property for contents of the physical object routed to the third address, wherein the third address describes a third point of routing the physical object, the third point is a destination point of the physical object if the second functional property code is not compatible with the first functional property code;
receive the first address and the first functional property code from the first point;
determine the third address if the first functional property code is not compatible with the second functional property code, wherein the third address reflects a match between the obtained first functional property code and the stored third functional property code associated with the second address in order to ascertain the third address; and
send the third address to the first point if the first functional property code is not compatible with the second functional property code.

44. The system of claim 43, wherein the first point is further operable to facilitate routing of the physical object to the third point based on the third address.

45. The system of claim 43, wherein a label containing the third address is associated with an object and is used to facilitate routing of the object to the third point.

46. The system of claim 43, wherein the first point is further operable to facilitate retrieving an object from the second point based on the third address.

47. The system of claim 43, wherein the second address comprises a partial postal address.

48. The system of claim 43, wherein the second address matches the third address.

49. The system of claim 43, wherein the first address comprises part of the second address.

50. The system of claim 43, wherein the third address comprises a pseudo-address.

51. The system of claim 43, wherein the first point comprises an origin point.

52. The system of claim 43, wherein the second point comprises a destination point.

53. The system of claim 43, wherein the data base is co-located with the first point.

54. The system of claim 43, wherein the data base is remote from the first point.

55. The system of claim 43, wherein the data base comprises a processor and a memory.

56. The system of claim 43, wherein the first address is compatible with the second address if the first address matches the second address.

57. The system of claim 43, wherein the first address is compatible with the second address if the first address matches part of the second address.

58. The system of claim 43, wherein the first functional property code is compatible with the second functional property code if the first functional property codes matches the second functional property code.

59. The system of claim 43, wherein the first point is further operable to store the first functional property code.

60. The system of claim 59, wherein the first point is further operable to modify the first functional property code before sending the first functional property code to the data base.

61. The system of claim 60, wherein modifying the first functional property code comprises substituting another functional property code for the first functional property code.

62. The system of claim 43, wherein the data base is further operable to send a no match code to the first point if the first address is incompatible with the second address.

63. The system of claim 43, wherein the data base is further operable to send a no match code to the first point if the first functional property code is incompatible with the second functional property code.

64. The system of claim 43, wherein the data base is further operable to store a fourth functional property code and a fourth address associated with a third point, wherein the third point is also associated with the second address.

65. The system of claim 64, wherein the data base is further operable to determine if the first functional property code is compatible with the fourth functional property code if the first functional property code is incompatible with the second functional property code.

66. The system of claim 65, wherein the data base is further operable to send a no match code to the first point if the first functional property code is incompatible with the second functional property code and the fourth functional property code.

67. The system of claim 64, wherein the data base is further operable to:

determine if the first functional property code is compatible with the fourth functional property code if the first address is compatible with the second address; and select between the third address and the fourth address if the first functional property code is compatible with the third functional property code and the fourth functional property code.

68. The system of claim 67, wherein selecting between the third address and the fourth address comprises selecting the address associated with whichever of the second functional property code and the third functional property code matches the first functional property code.

69. The system of claim 43, wherein the data base is further operable to store a third functional property code, a second address, and a third address for each of a plurality of second points.

70. The system of claim 69, wherein the data base is further operable to determine if the first address is compatible with any of the second addresses in determining if the first address is compatible with the second address.

71. The system of claim 70, wherein the data base is further operable to send a no match code to the first point if the first address is incompatible with all of the second addresses.

72. The system of claim 43, wherein the data base is further operable to store at least one additional functional property code associated with the second point, such that the second point has multiple associated second functional property codes.

73. The system of claim 72, wherein the first functional property code is compatible with the second functional property code if the first functional property code is compatible with at least one of the second functional property codes.

74. The system of claim 73, wherein the data base is further operable to send a no match code to the first point if the first functional property code is incompatible with all of the second functional property codes.

75. The system of claim 73, wherein at least one of the second functional property codes comprises a negated functional property code, whereby the first functional property code is not compatible with the second functional property codes if the first functional property code is compatible with the negated second functional property code.

76. The system of claim 73, wherein at least one of the second functional property codes comprises a mandatory functional property code, whereby the first functional property code is not compatible with the second functional property codes if the first functional property code is not compatible with the mandatory functional property code.

77. The system of claim 72, wherein the first point is further operable to obtain and send at least one additional functional property code associated with the first address, such that the first address has multiple associated first functional property codes.

78. The system of claim 77, wherein the first functional property code is compatible with the second functional property code if each of the first functional property codes is compatible with at least one of the second functional property codes.

79. The system of claim 43, wherein the transportation network is a parcel delivery network.

80. A method for routing a physical an object in a transportation network, comprising:

obtaining, at a first point, a first address and a first functional property code associated with a first point to be routed, wherein the first address is the first point of routing a physical object, and wherein the first functional property code describes an intended purpose or property for contents of the physical object routed from the first address;

obtaining, at the first point, a second address and a second functional property code associated with a second point to be routed, wherein the second functional property code describes an intended purpose or property for contents of the physical object routed to the second address, wherein the second address describes a second point of routing the physical object, the second point being a requested destination point of the physical object;

communicating the first address, the first functional property code, the second address, and the second functional property code;

determining, at a remote location in an electronic processing environment, a third address associated with a third point if the first functional property code is not compatible with the second functional property code, wherein the third address reflects a match between the obtained first functional property code and a third functional property code associated with the second address;

receiving the third address at the first point; and routing the physical object to the third point based at least on the third address.

81. The method of claim 80, wherein facilitating routing comprises associating a label containing the third address with the object.

82. The method of claim 80, wherein facilitating routing comprises selecting a network node to which to route the object.

83. The method of claim 80, further comprising facilitating retrieval of the object from the second point based on the second address.

84. The method of claim 80, wherein obtaining a first address and a first functional property code comprises detecting signals from a keyboard that designate the first address and the first functional property code.

85. The method of claim 84, wherein detecting signals comprises detecting signals indicating the selection of the first address and the first functional property code in a display menu.

86. The method of claim 85, wherein the first address and the first functional property code are displayed in a graphical user interface.

87. The method of claim 80, wherein the first address comprises a partial postal address.

88. The method of claim 80, wherein the second address comprises a pseudo-address.

89. The method of claim 80, wherein the first point comprises an origin point.

90. The method of claim 80, wherein the third second point comprises a destination point.

91. The method of claim 80, further comprising storing the first functional property code at the first point.

92. The method of claim 91, further comprising modifying the first functional property code before communicating the first functional property code.

93. The method of claim 92, wherein modifying the first functional property code comprises substituting another functional property code for the first functional property code.

94. The method of claim 92, wherein modifying the first functional property code comprises adding another functional property code to the first functional property code such that there are multiple functional property codes associated with the first address.

95. The method of claim 80, wherein obtaining a first address and a first functional property code comprises generating the functional property code based on automated optical recognition of the object.

96. The method of claim 80, further comprising receiving a no match code indicating that the first address is incompatible.

97. The method of claim 80, further comprising receiving a no match code indicating that the first functional property code is incompatible.

98. The method of claim 80, further comprising obtaining and communicating at least one additional functional property code associated with the first address, such that the first address has multiple associated first functional property codes.

99. The method of claim 98, wherein at least one of the first functional property codes comprises a negated functional property code.

100. The method of claim 99, wherein at least one of the first functional property codes comprises a mandatory functional property code.

101. The method of claim 74, wherein the transportation network is a parcel delivery network.

102. A method for routing a physical object in a transportation network, comprising:
   receiving a first address and a first functional property code associated with a first point to be routed, wherein the first address is the first point of routing a physical object, and wherein the first functional property code describes an intended purpose or property for contents of the physical object routed from the first address;
   storing, in a database, a second address and a second functional property code associated with a second point, wherein the second functional property code describes an intended purpose or property for contents of the physical object routed to the second address, wherein the second address describes a second point of routing the physical object, the second point being a requested destination point of the physical object;
   storing, in the second database, a third functional property code and a third address associated with the second address, wherein the third functional property code describes an intended purpose or property for contents of the physical object routed to the third address, wherein the third address describes a third point of routing the physical object, the third point is a destination point of the physical object if the second functional property code is not compatible with the first functional property code;
   determining the third address in the electronic processing environment if the first functional property code is not compatible with the second functional property code, wherein the third address reflects a match between the obtained first functional property code and the stored third functional property code associated with the second address; and
   generating the third address if the first functional property code is not compatible with the second functional property code.

103. The method of claim 102, wherein the second address comprises a partial postal address.

104. The method of claim 102, wherein the second address matches the third address.

105. The method of claim 102, wherein the first address comprises part of the second address.

106. The method of claim 102, wherein the third address comprises a pseudo-address.

107. The method of claim 102, wherein the point comprises a destination point.

108. The method of claim 102, wherein the first address is compatible with the second address if the first address matches the second address.

109. The method of claim 102, wherein the first address is compatible with the second address if the first address matches part of the second address.

110. The method of claim 102, wherein the first functional property code is compatible with the second functional property code if the first functional property codes matches the second functional property code.

111. The method of claim 102, further comprising generating a no match code if the first address is incompatible with the second address.

112. The method of claim 102, further comprising generating a no match code if the first functional property code is incompatible with the second functional property code.

113. The method of claim 102, further comprising storing a fourth functional property code and a fourth address associated with a third point, wherein the third point is also associated with the second address.

114. The method of claim 113, further comprising determining if the first functional property code is compatible with the fourth functional property code if the first functional property code is incompatible with the second functional property code.

115. The method of claim 114, further comprising generating a no match code if the first functional property code is incompatible with the second functional property code and the fourth functional property code.

116. The method of claim 113, further comprising:
   determining if the first functional property code is compatible with the fourth functional property code if the first address is compatible with the second address;
   selecting between the third address and the fourth address if the first functional property code is compatible with the third functional property code and the fourth functional property code.

117. The method of claim 116, wherein selecting between the third address and the fourth address comprises selecting the address associated with whichever of the third functional property code and the fourth functional property code matches the first functional property code.

118. The method of claim 102, wherein a data base stores the third functional property code, a second address, and a third address for each of a plurality of second points.

119. The method of claim 118, wherein determining if the first address is compatible with the second address comprises determining if the first address is compatible with any of the second addresses.

120. The method of claim 119, further comprising generating a no match code if the first address is incompatible with all of the second addresses.

121. The method of claim 102, further comprising storing at least one additional functional property code associated with the second point, such that the second point has multiple associated third functional property codes.

122. The method of claim 121, wherein the first functional property code is compatible with the second functional property code if the first functional property code is compatible with at least one of the second functional property codes.

123. The method of claim 122, further comprising generating a no match code if the first functional property code is incompatible with all of the second functional property codes.

124. The method of claim 122, wherein at least one of the second functional property codes comprises a negated functional property code, whereby the first functional property code is not compatible with the second functional property codes if the first functional property code is compatible with the negated second functional property code.

125. The method of claim 122, wherein at least one of the second functional property codes comprises a mandatory functional property code, whereby the first functional property code is not compatible with the second functional property codes if the first functional property code is not compatible with the mandatory second functional property code.

126. The method of claim 121, further comprising receiving at least one additional functional property code associated with the first address, such that the first address has a plurality of associated first functional property codes.

127. The method of claim 125, wherein the first functional property code is compatible with the second functional property code if each of the first functional property codes is compatible with at least one of the second functional property codes.

128. The method of claim 102, wherein the transportation network is a parcel delivery network.

129. An apparatus for routing a physical object in a transportation network, comprising:
a memory operable to store:
a first address and a first functional property code associated with a first point to be routed, wherein the first address is the first point of routing a physical object, and wherein the first functional property code describes an intended purpose or property for contents of the physical object routed from the first address;
a second address and a second functional property code associated with a second point, wherein the second functional property code describes an intended purpose or property for contents of the physical object routed to the second address, wherein the second address describes a second point of routing the physical object, the second point being a requested destination point of the physical object; and
a third functional property code and a third address associated with the second address, wherein the third functional property code describes an intended purpose or property for contents of the physical object routed to the third address, wherein the third address describes a third point of routing the physical object, the third point is a destination point of the physical object if the second functional property code is not compatible with the first functional property code; and
a processor coupled to the memory, the processor programmed to:
receive the first address and the first functional property code;
determine the third address if the first functional property code is not compatible with the second functional property code, wherein the third address reflects a match between the obtained first functional property code and the stored third functional property code associated with the second address; and
generate a signal representing the third address if the first functional property code is not compatible with the second functional property code.

130. The apparatus of claim 129, wherein the second address comprises a partial postal address.

131. The apparatus of claim 129, wherein the second address matches the third address.

132. The apparatus of claim 129, wherein the first address comprises part of the second address.

133. The apparatus of claim 129, wherein the third address comprises a pseudo-address.

134. The apparatus of claim 129, wherein the second point comprises a destination point.

135. The apparatus of claim 129, wherein the first address is compatible with the second address if the first address matches the second address.

136. The apparatus of claim 129, wherein the first address is compatible with the second address if the first address matches part of the second address.

137. The apparatus of claim 129, wherein the first functional property code is compatible with the second functional property code if the first functional property codes matches the second functional property code.

138. The apparatus of claim 129, wherein the processor is further operable to generate a no match code if the first address is incompatible with the second address.

139. The apparatus of claim 129, wherein the processor is further operable to generate a no match code if the first functional property code is incompatible with the second functional property code.

140. The apparatus of claim 129, wherein the memory is further operable to store a fourth functional property code and a fourth address associated with a third point, wherein the third point is also associated with the second address.

141. The apparatus of claim 140, wherein the processor is further operable to determine if the first functional property code is compatible with the third functional property code if the first functional property code is not compatible with the second functional property code.

142. The apparatus of claim 141, wherein the processor is further operable to generate a no match code if the first functional property code is incompatible with the second functional property code and the fourth functional property code.

143. The apparatus of claim 140, wherein the processor is further operable to:
determine if the first functional property code is compatible with the fourth functional property code if the first address is compatible with the second address; and
select between the third address and the fourth address if the first functional property code is compatible with the third functional property code and the fourth functional property code.

144. The apparatus of claim 143, wherein selecting between the third address and the fourth address comprises selecting the address associated with whichever of the third functional property code and the fourth functional property code matches the first functional property code.

145. The apparatus of claim 129, wherein the memory is further operable to store a third functional property code, a second address, and a third address for each of a plurality of second points.

146. The apparatus of claim 145, wherein the processor is further operable to determine if the first address is compatible with any of the second addresses to determine the first address is compatible with the second address.

147. The apparatus of claim 146, wherein the processor is further operable to generate a no match code if the first address is incompatible with all of second addresses.

148. The apparatus of claim 129, further comprising storing at least one additional functional property code associated with the second point, such that the second point has multiple associated second functional property codes.

149. The apparatus of claim 148, wherein the first functional property code is compatible with the second functional property code if the first functional property code is compatible with at least one of the second functional property codes.

150. The apparatus of claim 149, wherein the processor is further operable to generate a no match code if the first functional property code is incompatible with all of the second functional property codes.

151. The apparatus of claim 149, wherein at least one of the second functional property codes comprises a negated functional property code, whereby the first functional property code is not compatible with the second functional property codes if the first functional property code is compatible with the negated second functional property code.

152. The apparatus of claim 151, wherein at least one of the second functional property codes comprises a mandatory functional property code, whereby the first functional property code is not compatible with the second functional property codes if the first functional property code is not compatible with the mandatory second functional property code.

153. The apparatus of claim 148, wherein the processor is further operable to receive at least one additional functional property code associated with the first address, such that the first address has a plurality of associated first functional property codes.

154. The apparatus of claim 153, wherein the processor is further operable to determine if each of the first functional property codes is compatible with at least one of the second functional property codes to determine is the first functional property code is compatible with the second functional property code.

155. The apparatus of claim 129, wherein the transportation network is a parcel delivery network.

156. A method for routing a physical object in a transportation network, comprising:
  obtaining, at a first point, a first address and a stored code associated with a physical object to be routed;
  determining electronically whether to use the stored code or an alternative property code as a first functional property code based on whether a user provides the alternative property code, wherein the first functional property code describes an intended purpose or property for contents of the physical object routed from the first address;
  storing, in an electronic database, a second address and a second functional property code associated with a second point, wherein the second functional property code describes an intended purpose or property for contents of the physical object routed to the second address, wherein the second address describes a second point of routing the physical object, the second point being a requested destination point of the physical object;
  storing, in the database, a third functional property code and a third address associated with the second address, wherein the third functional property code describes an intended purpose or property for contents of the physical object routed to the third address, wherein the third address describes a third point of routing the physical object, the third point is a destination point of the physical object if the second functional property code is not compatible with the first functional property code;
  determining the third address in the electronic processing environment if the first functional property code is not compatible with the second functional property code, wherein the third address reflects a match between the obtained first functional property code and the stored third functional property code associated with the second address; and
  sending the third address to the first point if the first functional property code is not compatible with the second functional property code.

157. The method of claim 156, wherein the stored code comprises a default functional property code associated with the first point.

158. The method of claim 156, wherein obtaining, at the first point, the first address and the stored code comprises:
  receiving, at the first point, the first address from the user; and
  accessing, at the first point, the stored code from a memory.

159. The method of claim 158, wherein determining whether to use the stored code or the alternative property code is based on whether a prefix is provided for the first address, and wherein the alternative property code comprises the prefix.

160. The method of claim 156, further comprising routing the object to the third point based on the third address.

161. The method of claim 160, wherein routing the object to the third point based on the third address comprises associating a label containing the third address with the object.

162. The method of claim 156, further comprising retrieving the object from the third point based on the third address.

163. The method of claim 156, wherein the second address comprises a partial postal address.

164. The method of claim 156, wherein the second address matches the third address.

165. The method of claim 156, wherein the first address comprises part of the second address.

166. The method of claim 156, wherein the third address comprises a pseudo-address.

167. The method of claim 156, wherein the first point comprises an origin point.

168. The method of claim 156, wherein the second point comprises a destination point.

* * * * *